(12) United States Patent
Matsushita

(10) Patent No.: US 8,122,246 B2
(45) Date of Patent: Feb. 21, 2012

(54) METHOD FOR GENERATING DECRYPTION KEY, APPARATUS AND METHOD USING DECRYPTION KEY

(75) Inventor: Tatsuyuki Matsushita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1163 days.

(21) Appl. No.: 11/531,553

(22) Filed: Sep. 13, 2006

(65) Prior Publication Data

US 2007/0180233 A1 Aug. 2, 2007

(51) Int. Cl.
*H04L 9/00* (2006.01)
(52) U.S. Cl. .......... 713/159; 380/44; 380/277; 380/279; 380/278; 713/160; 713/163
(58) Field of Classification Search ........................ None
See application file for complete search history.

(56) References Cited

U.S. PATENT DOCUMENTS

| 2003/0152234 A1 | 8/2003 | Matsushita | |
|---|---|---|---|
| 2005/0157878 A1* | 7/2005 | Matsushita | 380/239 |
| 2005/0265550 A1* | 12/2005 | Tuyls et al. | 380/259 |

FOREIGN PATENT DOCUMENTS

| JP | 2002-152187 | 5/2002 |
|---|---|---|
| JP | 2002-314532 | 10/2002 |
| JP | 2003-87232 | 3/2003 |
| JP | 2003-289296 | 10/2003 |
| JP | 2005-236963 | 9/2005 |

OTHER PUBLICATIONS

Kaoru Kurosawa, et al., "Optimum Traitor Tracing and Asymmetric Schemes" Proceedings of EUROCRYPT '98, LNCS 1403, Springer-Verlag, 1998, pp. 145-157.
Mani Naor, et al., "Efficient Trace and Revoke Schemes", Proceedings of Financial Cryptography '00, LNCS 1962, Springer-Verlag, 2000, 11 pages.
Dalit Naor, et al., "Revocation and Tracing Schemes for Stateless Receivers", Proceedings of Crypto '01, LNCS 2139, Springer-Verlag, 2001, pp. 41-62.
MoonShik Lee. et al, Breaking Two k-Resilient Traitor Tracing Schemes with Sublinear Ciphertext Size, LNCS, Applied Cryptography and Network Security, vol. 5536, Jun. 2009, pp. 238-252.

(Continued)

*Primary Examiner* — Nasser Moazzami
*Assistant Examiner* — Fikremariam A Yalew
(74) *Attorney, Agent, or Firm* — Oblon, Spivak, McClelland, Maier & Neustadt, L.L.P.

(57) ABSTRACT

A decryption key unique to each user system is a value obtained by (a)assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves and a common key generation polynomial common to the root, the nodes, and the leaves.

26 Claims, 13 Drawing Sheets

OTHER PUBLICATIONS

Tatsuyuki Matsushita, et al, Hierarchical Key Assignment for Black-Box Tracing with Efficient Ciphertext Size, LNCS, Information and Communication Security, vol. 4307, Dec. 2006, pp. 92-111.

Tatsuyuki Matsushita, et al. Hierarchical Key Assignment for Efficient Public-Key Black-Box Tracing against Self-Defensive Pirates, The Institute of Electronics, Information and Communication Engineers, IEICE Technical Report ISEC2006, , vol. 106, No. 176, Jul. 14, 2006, pp. 91-98.

Goichiro Hanaoka, et al, Trade-off Traitor Tracing, Tradeoff unauthorized user tracking method, The Institute of Electronics, Information and Communication Engineers, Technical Report IEICE ISEC2004, vol. 104. No. 315, Sep. 10, 2004, pp. 39-45.

Kazuto Ogawa, et al, A Secure Traitor Tracing Scheme against Key Exposure, The Institute of Electronics, Information and Communication Engineers, Technical Report IEICE ISEC2004, vol. 104, No. 199, Jul. 13, 2004, pp. 151-158.

Tatsuyuki Matsushita, et al. Black-Box Tracing against Self-Defensive Pirate Decoders, The Proceeding of symposium of encryption and information security 2004 (CD-ROM) Jan. 27-30, 2004, 9 pages.

\* cited by examiner

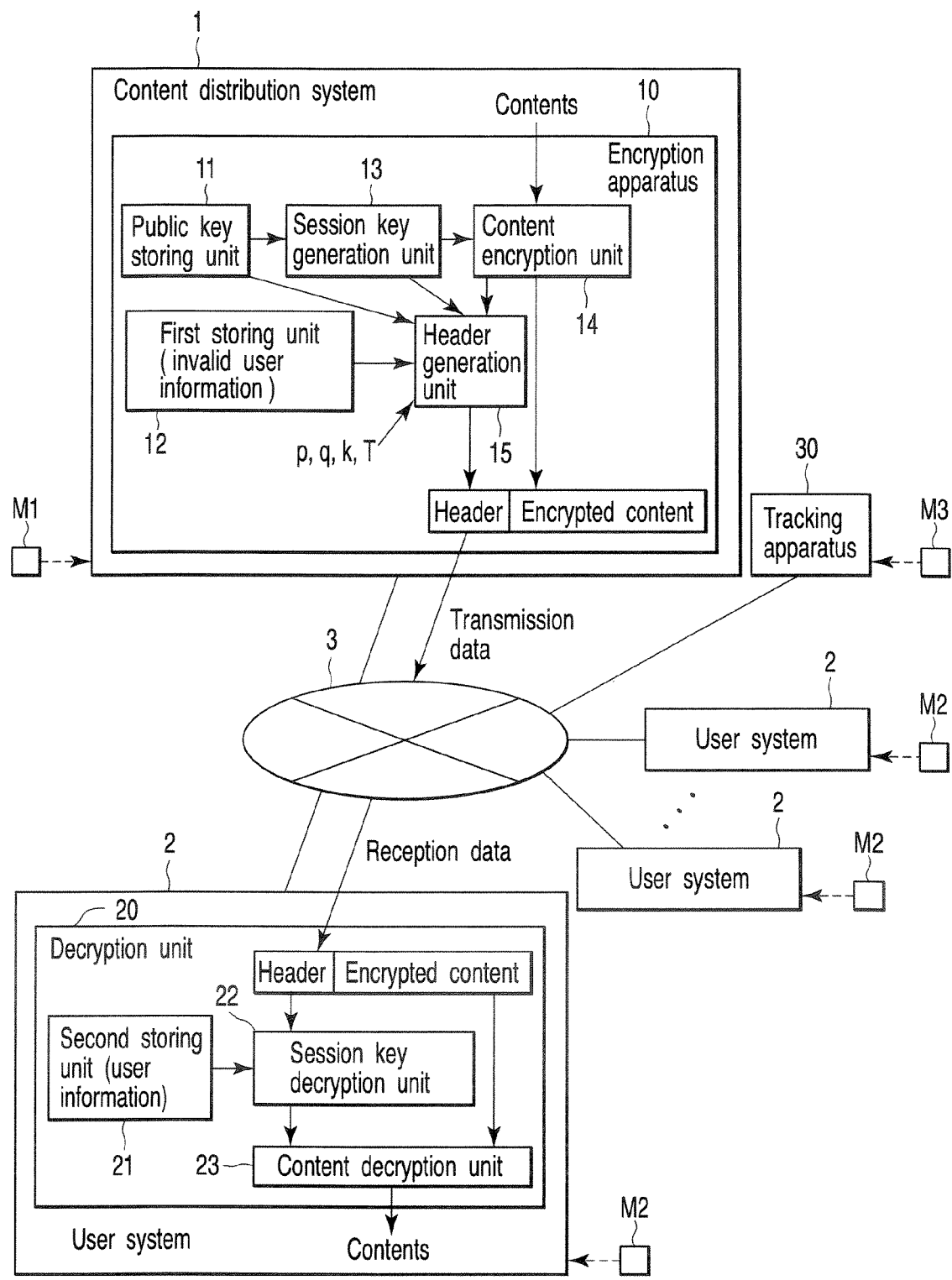
F I G. 1

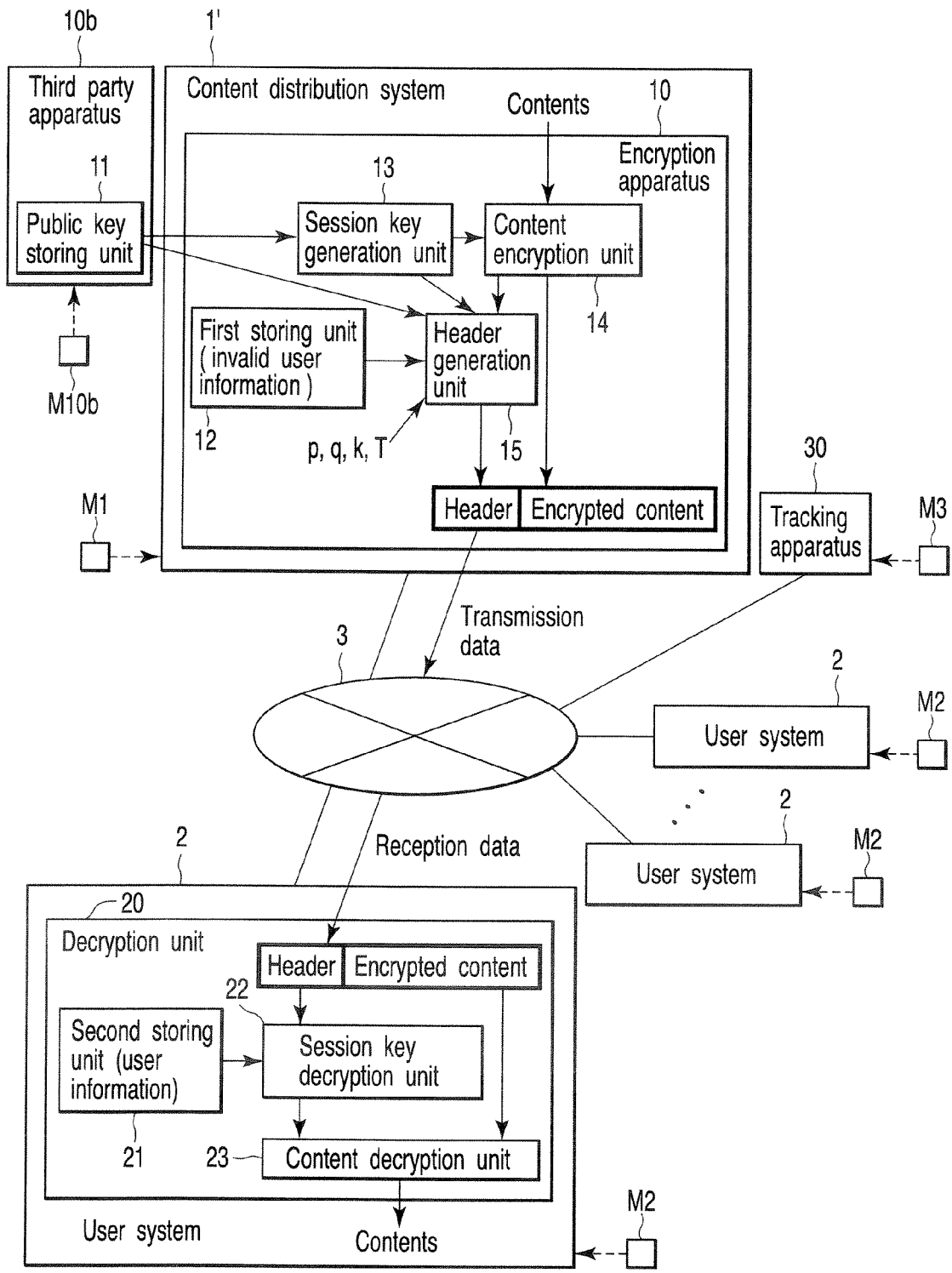
F I G. 1 2

FIG. 17A $\underbrace{1, 2, 3, ..., 20}_{U_1}$, $\underbrace{21, 22, 23, ..., 40}_{U_2}$, ..., $\underbrace{381, 382, 383, ..., 400}_{U_{20}}$, ...

FIG. 17B $\underbrace{1, 2, 3, ..., \underline{20}}_{U_1}$, $\underbrace{21, 22, 23, ..., 40}_{U_2}$, ..., $\underbrace{381, 382, 383, ..., 400}_{U_{20}}$, ...

FIG. 17C $\underbrace{\underline{1}, \underline{2}, \underline{3}, ..., \underline{20}}_{U_1}$, $\underbrace{\underline{21}, \underline{22}, \underline{23}, ..., 40}_{U_2}$, ..., $\underbrace{381, 382, 383, ..., 400}_{U_{20}}$, ...

METHOD FOR GENERATING DECRYPTION KEY, APPARATUS AND METHOD USING DECRYPTION KEY

CROSS-REFERENCE TO RELATED APPLICATIONS

This application is based upon and claims the benefit of priority from prior Japanese Patent Application No. 2006-019795, filed Jan. 27, 2006, the entire contents of which are incorporated herein by reference.

BACKGROUND OF THE INVENTION

1. Field of the Invention

The present invention relates to a system for decrypting an encrypted content.

2. Description of the Related Art

Conventionally, in broadcast-type content distribution business, broadcast program content is encrypted, and the encrypted content is distributed to users. For example, a user decrypts encrypted content by using an authorized decryption unit leased by a distributor, and views/listens to the broadcast program through the obtained content. In broadcast-type content distribution business, however, there are unauthorized users who produce pirate decryption units (unauthorized decryption units) by copying internal information (decryption key or the like) of an authorized decryption unit, and can illegally decrypt encrypted content.

Various types of unauthorized user specifying methods are known, which can specify such an unauthorized user. Such unauthorized user specifying methods are classified into three types according to decryption key generation methods for users. The first type is a method based on a combinatric arrangement. The second type is a method based on a tree structure. The third type is a method based on an algebraic arrangement.

The first unauthorized user specifying method has a problem that a very large transmission overhead is required to sufficiently decrease the probability at which an authorized user who is not concerned in the generation of an unauthorized decryption unit is erroneously detected as an unauthorized user.

The second and third unauthorized user specifying methods solve this problem and achieve efficient transmission overhead.

An unauthorized decryption unit may store a plurality of decryption keys or data having functions equivalent to decryption keys in a conspiracy involving a plurality of unauthorized users. Black box tracking is sometimes performed for this unauthorized decryption unit to specify an unauthorized user by observing only the input/output of the unit without breaking it open. More specifically, a tracker who performs black box tracking assumes a candidate for an unauthorized user (to be referred to as a suspect hereinafter) and checks whether the decryption key of the suspect is held by an unauthorized decryption unit, by only observing the input/output of the unauthorized decryption unit.

In the second and third unauthorized user specifying methods, one of the following two problems is left unsolved:

Problem 1: In black box tracking, the intention of each input (assumed suspect) is known by an unauthorized decryption unit. If a smart unauthorized decryption unit reads the intention of an input and prevents the unauthorized user from being specified, black box tracking fails. This failure leads to a problem that an unauthorized user cannot be specified, or an innocent user is falsely accused.

Problem 2: Although an unauthorized decryption unit cannot read the intention of an input, the probability of correctly specifying an unauthorized user trades off with a transmission overhead. If, therefore, the transmission overhead is made efficient, the probability of correctly specifying an unauthorized user greatly decreases. The number of processing steps required for black box tracking is exponential, and hence such black box tracking is impracticable because a set of $nCk=n!/\{k!(n-k)!\}$ suspects must be checked, where n is the total number of users and k is the maximum number of conspirators.

As described above, the conventional unauthorized user specifying methods fail in black box tracking with respect to smart unauthorized decryption units. In consideration of this problem, JP-A 2005-236963 (KOKAI) discloses an unauthorized user specifying method which can reliably execute black box tracking even with respect to a smart unauthorized decryption unit without allowing it to know the intention of an input.

Of the unauthorized user specifying methods disclosed in JP-A 2005-236963 (KOKAI), a method which achieves more efficient transmission overhead is a method in which the amount of transmission data is reduced by assigning the leaves of a tree structure to users and making a key generation polynomial multilevel. In this case, since the memory size which a decryption unit can have is limited by the manufacturing cost and the like, there is a demand for reducing the size of decryption key data to be held by the decryption unit. It is therefore preferable to further reduce the size of decryption key data to be held by the decryption unit.

As described above, the conventional unauthorized user specifying methods cannot achieve the two challenges of reliably executing black box tracking even with respect to a smart unauthorized decryption unit without allowing it to know the intention of an input and reducing the size of decryption key data to be held by the decryption unit.

BRIEF SUMMARY OF THE INVENTION

A decryption key generation method includes (a) dividing a group of a plurality of user identification information items for individually identifying a plurality of user systems into a plurality of subgroups; (b) assigning the subgroups to a plurality of different leaves on a tree structure respectively, the tree structure including a root node, one or a plurality of nodes and the leaves; (c) assigning different individual key generation polynomials to all or some of the root, the nodes, and the leaves on the tree structure respectively; (d) assigning each subgroup one of the individual key generation polynomials which corresponds to one of leaves assigned to the each subgroup or an ancestor node of the one of the leaves; and (d) substituting each user identification information item in the each subgroup into the one of the individual key generation polynomial assigned to the each subgroup and a common key generation polynomial common to the root, the nodes, and the leaves, to obtain a decryption key unique to each user system which corresponds to the each user identification information item, wherein at least one of linear sums of coefficients with the same degree of the one of the individual key generation polynomial and the common key generation polynomial differs for each of the root, the nodes, and the leaves on the tree structure, and the linear sums of other coefficients with the same degrees are constant.

BRIEF DESCRIPTION OF THE SEVERAL VIEWS OF THE DRAWING

FIG. 1 is a schematic view showing the arrangement of a data communication system to which a content distribution system, user systems, and the like according to the first embodiment;

FIG. 12 is a schematic view showing a modification of the data communication system;

FIGS. 17A to 17C are views for explaining an unauthorized user.

DETAILED DESCRIPTION OF THE INVENTION

Each embodiment of the present invention will be described below with reference to the views of the accompanying drawing.

First Embodiment

Figure 2:
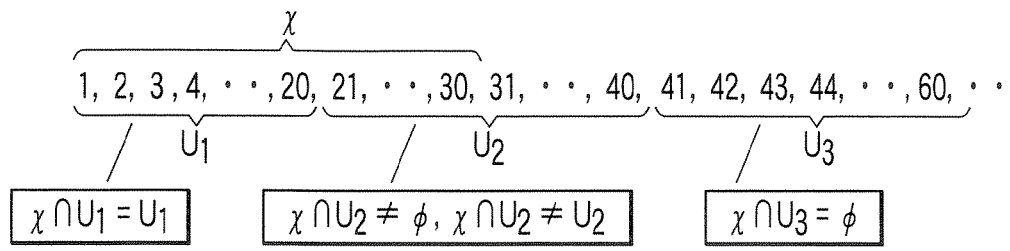
FIG. 2 is a schematic view for explaining the subgroups of a user set.
Figure 3:
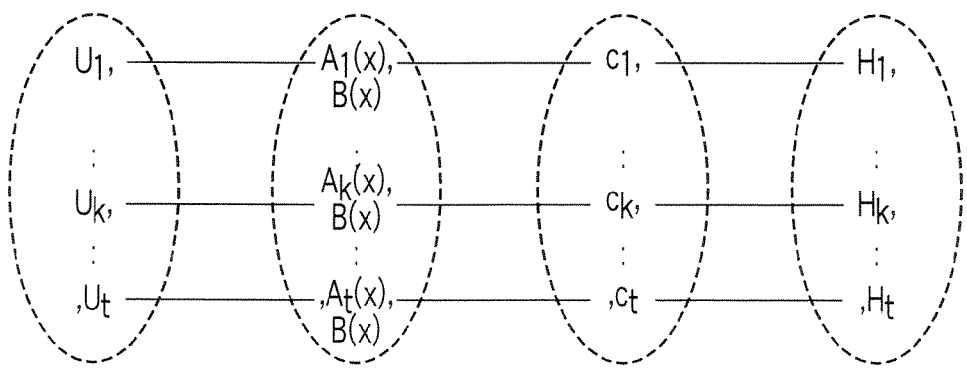
FIG. 3 is a schematic view for explaining the subgroups of a user set.
Figure 4:
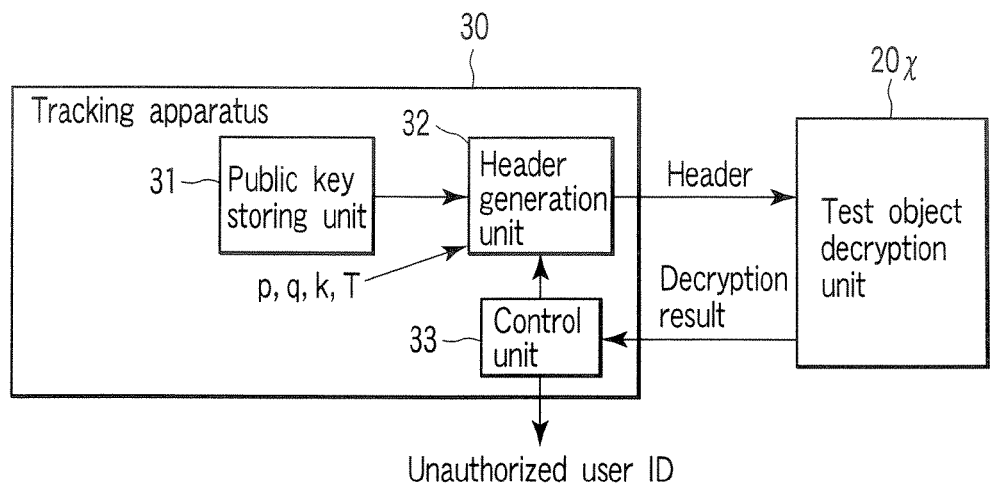
FIG. 4 is a schematic view showing the arrangement of a tracking system.

FIG. 1 is a schematic view showing the arrangement of a data communication system to which a content distribution system, user systems, and the like according to the present invention are applied. FIGS. 2 and 3 are schematic views for explaining subgroups of a user set in this embodiment. FIG. 4 is a schematic view showing the arrangement of a tracking apparatus according to the embodiment.

As shown in FIG. 1, in this data communication system, a content distribution system 1 including an encryption apparatus 10 and n user systems 2 each having a decryption unit 20 are connected to each other through a network 3. In addition, for example, a tracking apparatus 30 is connected to the network 3.

In this case, the content distribution system 1 encrypts content and broadcasts or multicasts it through the network 3.

The n user systems 2 each receive and decrypt the encrypted content broadcast or multicast by the content distribution system 1 through the network 3.

Although FIG. 1 shows only one content distribution system 1, a plurality of content distribution systems 1 may exist.

In addition, one node may have both the function of the content distribution system 1 and the function of the user system 2. Alternatively, all the nodes may each be provided with both the function of the content distribution system 1 and the function of the user system 2 to allow them to perform encrypted communication with each other.

The network 3 may be a wired network or a wireless network. Alternatively, the network 3 may include both a wired network and a wireless network, or may be a bidirectional network or a unidirectional network. In addition, the network 3 may be offline. That is, a network may be realized by using a medium such as a DVD.

The encryption apparatus 10 mounted in the content distribution system 1 will be described next.

The encryption apparatus 10 includes a public key storing unit 11, first storing unit 12, session key generation unit 13, content encryption unit 14, and header generation unit 15.

The public key storing unit 11 is a memory which stores a public key, from which information can be read by the session key generation unit 13 and the header generation unit 15.

The first storing unit 12 is a memory which stores information (user ID or the like) associated with a user to be invalidated, from which information can be read by the header generation unit 15.

The session key generation unit 13 has a function of generating a session key on the basis of a public key in the public key storing unit 11.

The content encryption unit 14 has a function of obtaining an encrypted content by encrypting a content to be distributed on the basis of the session key generated by the session key generation unit 13. Note that the encrypted content can be decrypted on the basis of the session key.

The header generation unit 15 has a function of generating header information on the basis of a public key, a session key (information on which it is based), invalid user information (if there is an invalid user), other necessary parameters (parameters p, q, k, and T in the case to be described later), and the like.

More specifically, the header generation unit 15 has a function of generating encrypted session key and three types of header information. An encrypted session key is generated by encrypting a session key with a public key.

First header information is associated with an invalid user, and includes no encrypted session key.

Second header information is associated with an invalid user and a valid user. The second header information includes an encrypted session key obtained by encrypting a session key with a public key and a value based on user identification information of at least one of user systems which are permitted to decrypt the encrypted session key. Note that an encrypted session key can be decrypted on the basis of a decryption key.

Third header information is associated with a valid user, and includes an encrypted session key. Note that the third header information includes no value based on the user identification information of a valid user. Note, however, that the third header information may include a value based on the user identification information of a valid user.

Assume that the content distribution system 1 comprises various types of devices as needed, e.g., a communication interface for header information and encrypted contents, a device which stores contents, and a device which inputs contents or a decryption key generating device (not shown). When transmitting pieces of header information to a plurality of subgroups, the content distribution system 1 preferably transmits them while letting the subgroups share the common portions of the respective pieces of header information from the viewpoint of a reduction in data amount. However, the present invention is not limited to this, and the common portions need not be shared.

In this case, the decryption key generating device is designed to generate a decryption key unique to each user system. The decryption key generating device has a function of obtaining a tree structure by dividing a group to which a plurality of pieces of user identification information for individually identifying a plurality of user systems belong into subgroups, a function of assigning the respective subgroups different key generation polynomials and a common key generation polynomial, and a function of substituting the pieces of user identification information of the respective user systems into the key generation polynomials for the subgroups to which the respective pieces of user identification information belong and setting the obtained values as decryption keys unique to the respective user systems.

Figure 15:
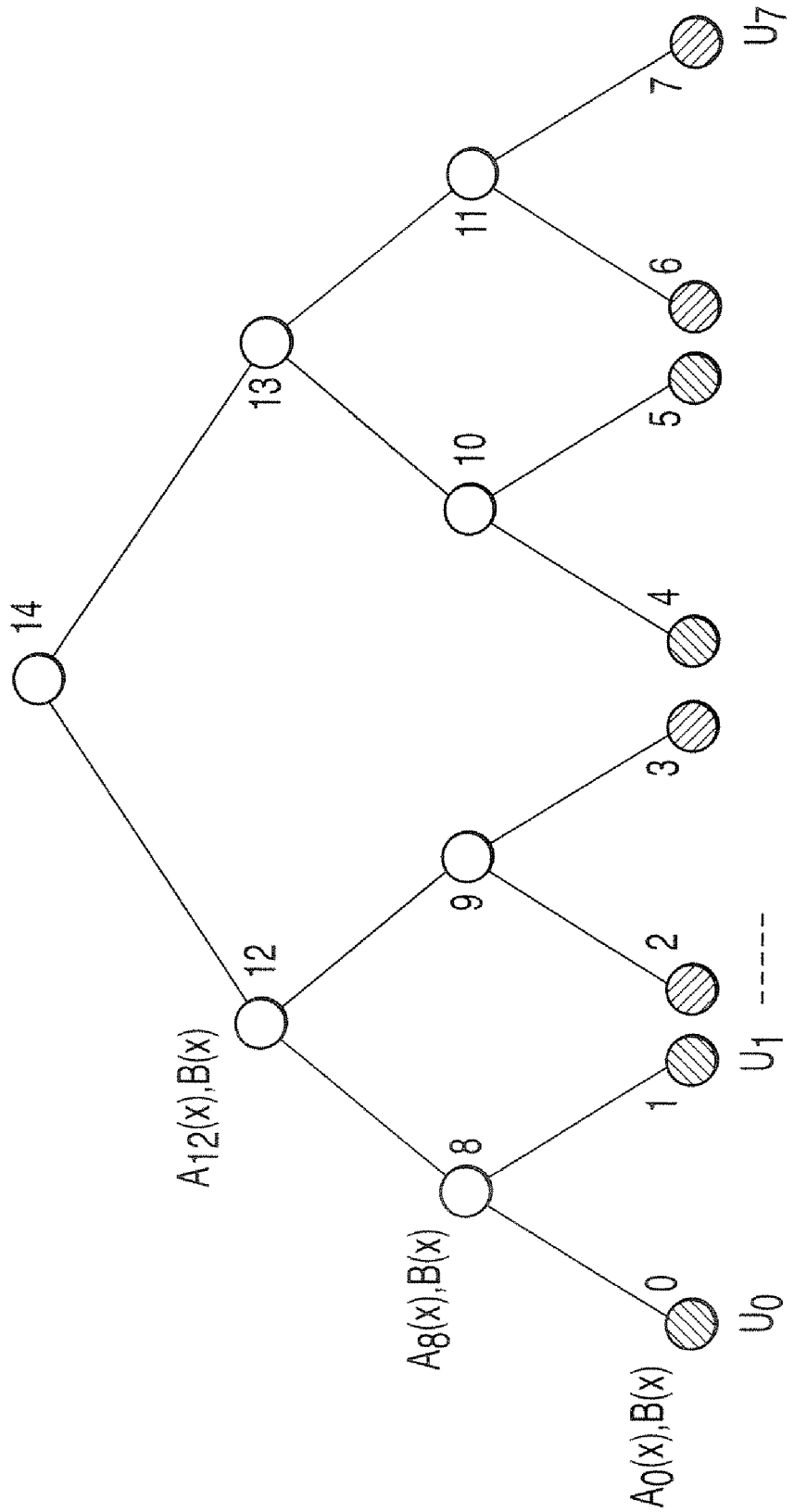
FIG. 15 is a view for explaining a tree structure.

More specifically, a decryption key for a user is generated by substituting the user ID (positive integers selected from a predetermined range (e.g., consecutive numbers from 1 to n)) into key generation polynomials. In this case, as shown in FIG. 15, a total user set U is divided into a plurality of subgroups and the respective subgroups are assigned to the leaves of a tree structure. FIG. 15 shows an example of a complete binary tree with a total leaf count of "8". Let L be a total leaf count, D be a tree depth, and T be a tree structure including each node ID and information indicating which subgroup is assigned to which leaf.

As shown in FIG. 15, in the tree structure T, IDs ("0", "1", "2", . . . , "13" in this case) are assigned to the respective nodes. Let $U_v$ be user sets assigned to leaves having a given node v as an ancestor. Note that the term "ancestor" is not limited to a root node, and means a parent node, a grandparent node, a great-grand parent, or the like. Referring to FIG. 15, for example, $U_8=U_0+U_1$ where "+" represents the sum of. Referring to FIG. 15, the total user set U is divided into subgroups $U_0, \ldots, U_7$.

FIG. 2 shows an example of subgroups $U_1$, $U_2$, and $U_3$. As shown in FIG. 3, a user set is divided into a plurality of subgroups, and key generation polynomials are assigned to the respective subgroups in the following manner.

For example, the subgroup $U_1$ is assigned $A_1(x)$ and $B(x)$.
The subgroup $U_2$ is assigned $A_2(x)$ and $B(x)$.
The subgroup $U_3$ is assigned $A_3(x)$ and $B(x)$.
Subsequently, likewise, a subgroup $U_i$ is assigned $A_i(x)$ and $B(x)$.

In this case, $A_i(x)$ is a key generation polynomial (individual key generation polynomial) unique to the subgroup $U_i$ (i.e., a node i), and $B(x)$ is a key generation polynomial (common key generation polynomial) common to the respective subgroups (i.e., the respective nodes). Note that the above manner of assignment is an example. For example, a key generation polynomial $A_i(x)$ may be randomly and uniquely assigned to a subgroup without being made to correspond to a subgroup number i, and a key generation polynomial $A_j(x)$ which is not assigned to any subgroups may exist.

In this manner, different key generation polynomials and a key generation polynomial common to the respective subgroups are assigned to the respective subgroups. A decryption key for a given user ID is generated by using the key generation polynomials assigned to the subgroups to which the user ID belongs. Note that the number of subgroups (excluding the root) to which the user ID belongs is represented by D. For example, in the case shown in FIG. 15, the user assigned to leaf 0 also belongs to the subgroups $U_8$ and $U_{12}$, and a decryption key for the user ID is generated by using the key generation polynomials assigned to the respective subgroups.

With this operation, in contrast to the conventional black box tracking method in which both the key generation polynomials $A_i(x)$ and $B_i(x)$ are different key generation polynomials for a node, in the present invention, as will be described later, introducing key generation polynomials which allow black box tracking with respect to a smart unauthorized decryption unit even by making one key generation polynomial $B(x)$ common to the respective nodes makes it possible to reduce the size of decryption key data to be held by the decryption unit.

Assume that the decryption key obtained by substituting the user ID assigned to the user system 2 into the key generation polynomials assigned to the subgroups to which the user ID belongs is supplied from the content distribution system 1 or a reliable third party to the user system 2 to be held therein in advance.

The grouping method exemplified by FIGS. 15, 2, and 3 is an example, and various grouping techniques can be used.

According to the above description, positive integers (e.g., consecutive numbers from 1 to n) selected from a predetermined range are used as user IDs or node IDs. However, user IDs need not be positive integers (for example, may be alphanumeric characters). A positive integer selected from a predetermined range may be uniquely assigned to a user ID constituted by alphanumeric characters or the like, and a decryption key can be calculated on the basis of the positive integer uniquely assigned to the user ID and corresponding key generation polynomials. The same applies to node IDs.

The decryption unit 20 mounted in the user system 2 will be described next.

As shown in FIG. 1, the decryption unit 20 includes a second storing unit 21, session key decryption unit 22, and content decryption unit 23.

The second storing unit 21 is a memory which stores parameters necessary for decryption (parameters p, q, and k in the case to be described later), the ID of a subgroup to which the user system 2 belongs, the user ID assigned to the user system 2, and a decryption key corresponding to the user ID. The session key decryption unit 22 can read information from the second storing unit 21. Note that the decryption key is the value obtained by substituting the user ID into the key generation polynomials assigned to the subgroup to which the user ID belongs.

The session key decryption unit 22 has a function of, upon receiving an encrypted content and header information from the content distribution system 1, acquiring (decrypting) a session key from the header information on the basis of the decryption key in the second storing unit 21.

The content decryption unit 23 has a function of decrypting the encrypted content received from the content distribution system 1, on the basis of the session key acquired (decrypted) by the session key decryption unit 22.

Assume that the user system 2 comprises various types of devices as needed, e.g., a communication interface which receives encrypted contents and header information from the content distribution system 1, a device which stores contents, a device which displays contents, and the like.

The tracking apparatus 30 will be described next with reference to FIG. 4.

The tracking apparatus 30 includes a public key storing unit 31, header generation unit 32, and control unit 33.

In this case, the public key storing unit 31 is a memory which stores public keys, from which information can be read by the header generation unit 32.

The header generation unit 32 has a function of generating header information on the basis of a public key and other necessary parameters (for example, parameters p, q, k, and T in the case to be described later) in accordance with the invalid user set designated by the control unit 33, and a function of inputting header information to a test object. Note that a session key (information on which it is based) may be generated by the control unit 33 and designated for the header generation unit 32, or may be generated by the header generation unit 32 and notified to the control unit 33. In addition, as described above, header information includes a session key which is encrypted so as to be decrypted with a decryption key unique to a user system and a value based on each user identification information of each user system which is permitted to decrypt the encrypted session key.

The control unit (specifying means) 33 performs overall control of the tracking apparatus 30, and has a function of specifying the unauthorized user or users of one or a plurality of user systems, which is the test object user system, on the basis of the relationship between header information generated by changing the number of user systems incapable of decryption and a decryption result acquired when the header information is input, under the control of the header generation unit 32.

The control unit 33 has a function of designating (one or a plurality) user ID or user IDs to be invalidated (i.e., an invalid user set $\chi$) with respect to the header generation unit 32, a function of inputting the session key decrypted by a test object decryption unit 20$\chi$ and checking whether a correct session key is obtained, and a function of repeating similar processing while changing an invalid user set and specifying the user ID of an unauthorized user by integrating the determination results.

Although the control unit 33 determines the decryption result of a session key obtained by the test object decryption unit 20$\chi$ (whether a correct session key is obtained), the present invention is not limited to this. The control unit 33 may input the content encrypted with a session key to the test object decryption unit 20$\chi$ in addition to header information, and determine whether the decryption result of the content obtained by the test object decryption unit 20$\chi$ (whether the content is decrypted).

The tracking apparatus 30 may be mounted in, for example, the content distribution system 1, or may be a apparatus independent of the content distribution system 1. In addition, the tracking apparatus 30 may or may not have a function of being connected to the network 3.

Figure 5:
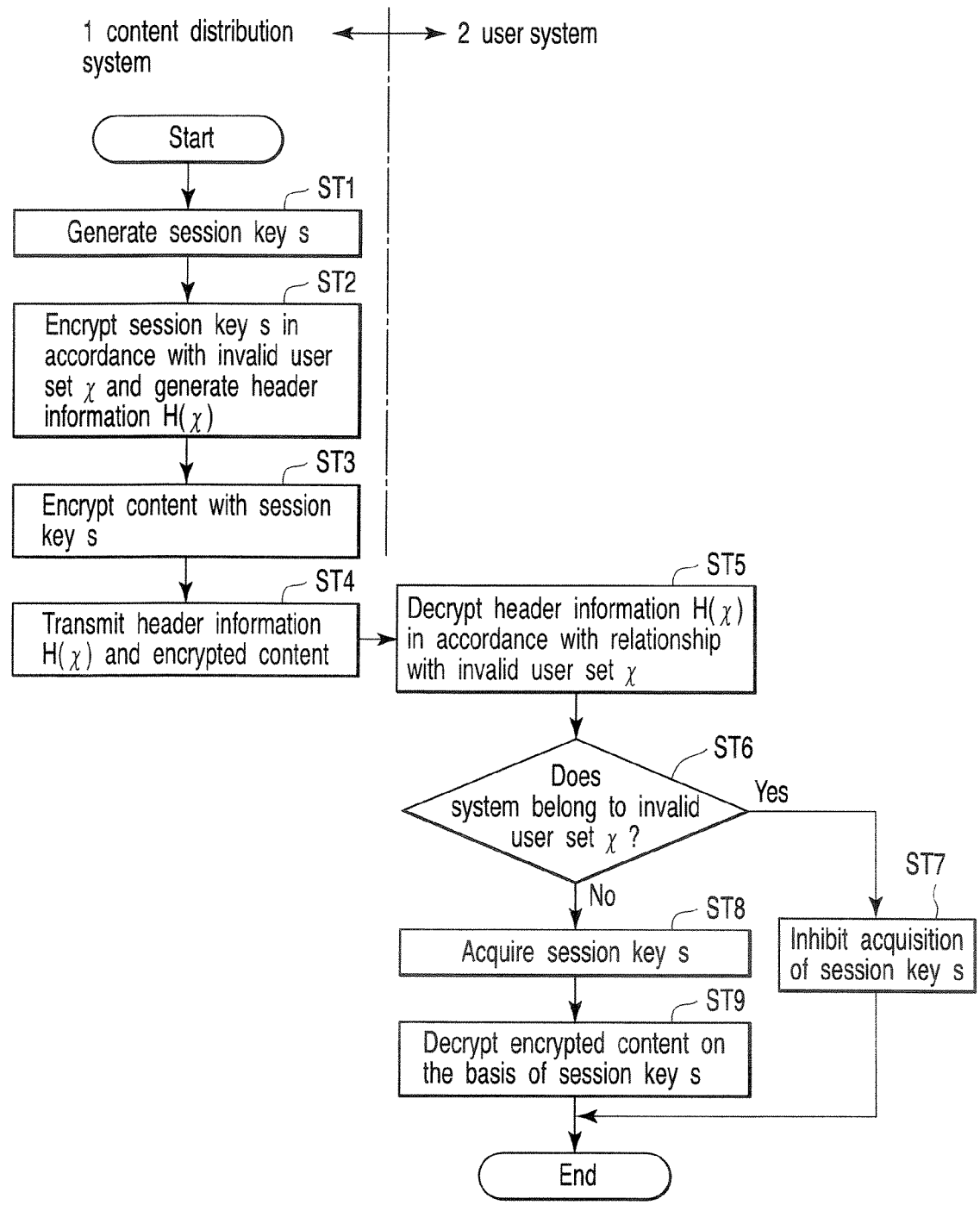
FIG. 5 is a flowchart for explaining the overall operation of the data communication system.

The operation of the network communication system having the above arrangement will be described next. FIG. 5 is a flowchart for explaining the overall operation of the system.

Assume that a unique user ID is assigned to each user system 2.

The content distribution system 1 generates a predetermined session key (single key) s (ST1), and generates header information H($\chi$) by encrypting the session key in accordance with an invalid user set (ST2).

The content distribution system 1 then encrypts a content with the session key s (ST3), and broadcasts or multicasts the obtained encrypted content upon adding header information to it (ST4).

Note that steps ST2 and ST3 may be executed in the order reverse to the above or may be simultaneously executed. If a session key is not changed for every decryption, step ST1 may sometimes be omitted (a previous session key is used).

Upon receiving header information/encrypted content, each user system 2 decrypts the header information in accordance with a relationship with the invalid user set $\chi$ on the basis of the self user ID and the subgroup ID (ST5).

In this case, if the user system 2 belongs to the invalid user set $\chi$ (ST6), no session key can be acquired (ST7). In contrast, if the user system does not belong to the invalid user set $\chi$ (ST6), a session key is acquired (ST8), and the encrypted content is decrypted with the session key (ST9).

As will be described in detail later, the content distribution system 1 can flexibly invalidate a decryption key because it generates header information in accordance with the invalid user set $\chi$. A decryption key is invalidated by encrypting a session key in a form in which no session key can be obtained by using the decryption key of an invalid user and the key can be decrypted with the decryption keys of users other than the invalid users.

Note that in broadcast-type content distribution, transmission data is generally encrypted with a single session key, and a key distribution method means a session key encryption/decryption method of encrypting a session key in a form that allows the key to be decrypted with the decryption key of each user.

A key generation phase to be executed in advance, an encryption phase in step ST2, and a decryption phase in steps ST5 to ST8 will be described in detail below.

First of all, parameters are defined.

Let n be the total number of users, and k be the maximum number of conspirators.

Assume that p and q are prime numbers, p−1 is divisible by q, and q is equal to or more than n+2k−1.

Assume that Zq={0, 1, . . . , q−1} and Zp*={1, . . . , p−1}.

Let Gq be a partial group of Zp* and also be a multiplicative group with q representing an order, and g be a generating element of Gq.

Assume that a user ID (user number) set (to be referred to as a user set hereinafter) is represented by U (U⊂Zq−{0}). Note that Zq−{0} indicates the value obtained by removing {0} from Zq.

Let $\chi$ be an invalid user set (a set of users whose decryption keys are invalidated).

The values of p, q, and g are disclosed.

Assume that calculation is to be performed on Zp*, unless otherwise specified. Note that Gq may be another group than the one specified above. For example, one can take as Gq an additive group of points of an elliptic curve over a finite field. This applies to other embodiments to be described later.

Key Generation Phase

This embodiment uses a binary tree structure with divided subgroups being assigned to leaves. More specifically, key generation polynomials are assigned to the respective nodes reaching from the root of the binary tree structure to a plurality of leaves through a plurality of nodes. With this, key generation polynomials are hierarchized into a multilevel structure. In the following case, a binary tree structure is used. However, the present invention is not limited to this. The number of branches is not specifically limited, and nodes with different numbers of branches may exist in one tree structure. In addition, the numbers of nodes (the numbers of levels) reaching from the root to leaves need not be the same with respect to all the leaves, and leaves located at different levels may exist.

Figure 16:
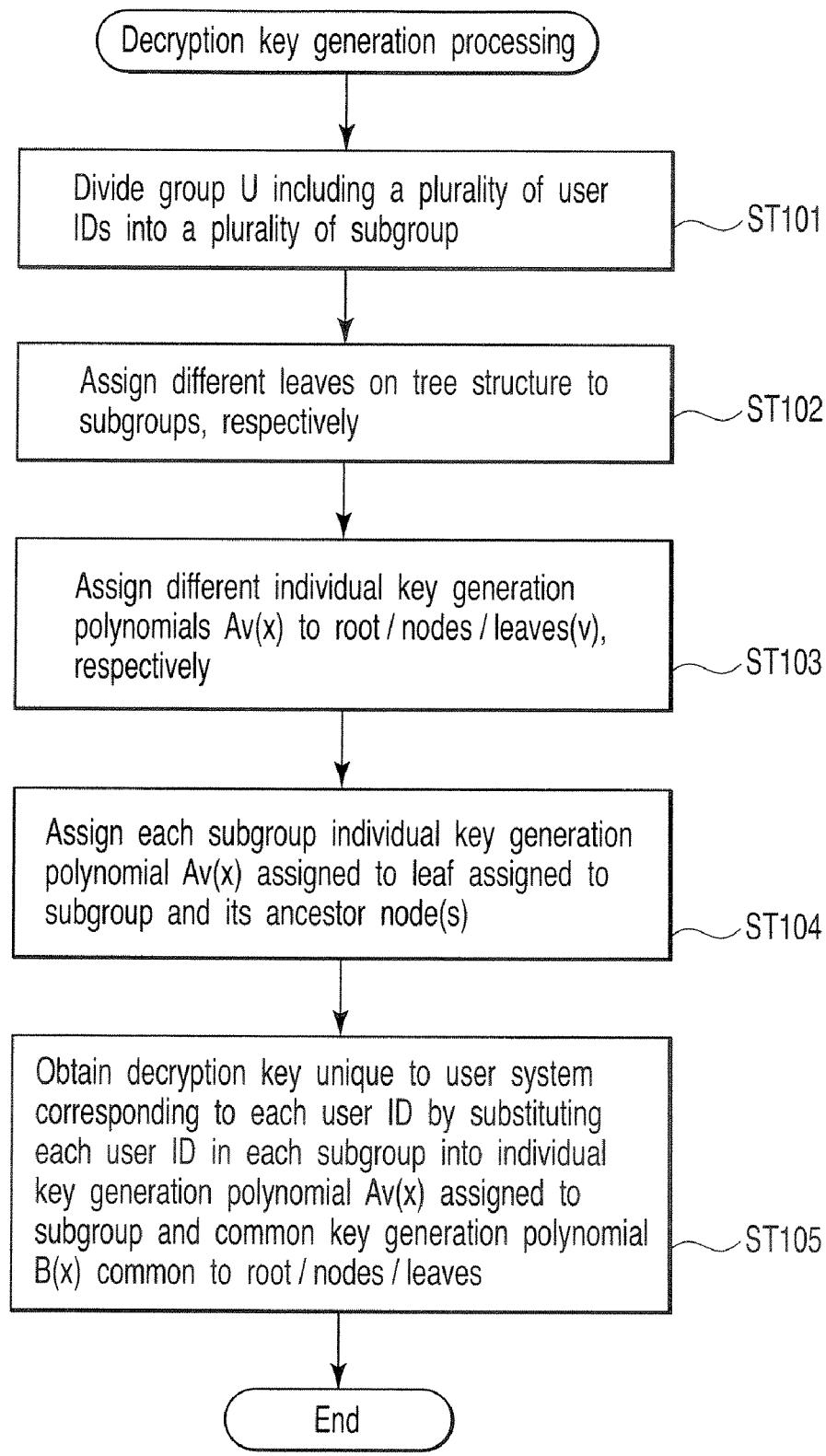
FIG. 16 is a flowchart for explaining decryption key generation processing operation.

A public key and decryption key generation processing in a user system corresponding to each user ID will be described below. Note that the flowchart of FIG. 16 shows decryption key generation processing in a user system corresponding to each user ID.

The content distribution system 1 divides the user set U into L or less partial sets (subgroups) having no common element (ST101). For the sake of simplicity, assume that the number of divided subgroups is represented by L, and L is a number represented by the power of two. The content distribution system 1 generates a complete binary tree whose total number of leaves is given by L and the tree depth is given by $D=\log_2 L$, and L subgroups are assigned to different leaves (ST102). Let T be a tree structure including information indicating which subgroup is assigned to which leaf and each node ID. T is disclosed.

Parameters $a_0, \ldots, a_{2k-1}, b_0, \ldots, b_{2k-1}$ on which a public key is based are randomly selected from Zq. In addition, with regard to each element i belonging to N, $c_i$ and $\lambda_i$ are randomly selected from Zq.

The content distribution system 1 then calculates a public key e. The pubic key e is given by $$e=(g, g^{\lambda_0}, \ldots, g^{\lambda_{2L-3}}, g^{a_0}, \ldots, g^{a_{2k-1}}, g^{c_0}, \ldots, g^{c_{2L-3}}) \quad (1)$$

In the tree structure T, let N be a set of the IDs of nodes and leaves excluding the root. For the sake of simplicity, N in the complete binary tree whose total number of leaves is given by L is $N=\{0, \ldots, 2L-3\}$. In the case shown in FIG. 15, $N=\{0, \ldots 13\}$.

The nodes/leaves (v) of the tree structure T are assigned an individual key generation polynomials $A_v(x)$, which differ from each other for the respective root/nodes/leaves, and the common key generation polynomial B(x) common to the root/nodes/leaves (ST103). Note that the common key generation polynomial B(x) common to the root/nodes/leaves need not be assigned to each root/node/leaf.

In addition, each subgroup is assigned an individual key generation polynomial which is assigned to a leaf assigned to the subgroup and its ancestor node(s) (ST104).

Let $U_v$ be a user set assigned to a leaf having a given node v as an ancestor. Referring to FIG. 15, for example, $U_8=U_0+U_1$ where "+" represents the sum of.

Lastly, the content distribution system 1 calculates the decryption key of a user ID=u which belongs to the user set (partial set) $U_v$ assigned to a leaf having the node v as an ancestor node by substituting x=u into the key generation polynomials $A_v(x)$ and B(x) (ST105). In this case, the generation polynomials $A_v(x)$ and B(x) are assigned to the partial set UV to which the user u belongs, and is given by $$A_v(x) = \sum_{i=0}^{2k-1} (a_{v,i} - \lambda_v b_i) x^i \bmod q \quad (2)$$

$$B(x) = \sum_{i=0}^{2k-1} b_i x^i \bmod q$$

$$a_{v,i} = \begin{cases} a_i (i \neq v \bmod 2k) \\ c_v (i = v \bmod 2k) \end{cases}$$

Letting $U_i$ be a user set assigned to a leaf having a given node i on the tree structure as an ancestor and $A_i(x)$ be an individual key generation polynomial assigned to the node i, a decryption key generation polynomial for the user set $U_i$ is given by, for example, $$A_i(x)+\lambda_i B(x)=a_0+c_i x+a_2 x^2+\ldots+a_{2k-1}x^{2k-1}$$

Letting $U_j$ be a user set assigned to a leaf having a node j different from the node i on the tree structure as an ancestor and $A_j(x)$ be an individual key generation polynomial assigned to the node j, a decryption key generation polynomial for the user set $U_j$ is given by, for example, $$A_j(x)+\lambda_j B(x)=a_0+c_j x+a_2 x^2+\ldots+a_{2k-1}x^{2k-1}$$

As described above, in the decryption key generation polynomial for the user set $U_i$ assigned to a leaf having the node i as an ancestor and the decryption key generation polynomial for the user set $U_j$ assigned to a leaf having the node j as an ancestor, the coefficients with the same degrees excluding one or a plurality of coefficients (e.g., $c_i$ and $c_j$) unique to the root/nodes/leaves on the tree structure are constant regardless of i and j.

That is, at least one of the linear sums of coefficients with the same degrees in the individual key generation polynomial $A_i(x)$ assigned to the node i and the common key generation polynomial B(x) common to the root/nodes/leaves is a coefficient unique to the root/nodes/leaves on the tree structure, and other coefficients, i.e., "mth degree coefficients of $A_i(x)$"+"mth degree coefficients of $\lambda_i B(x)$" are constant regardless of i and j.

A decryption key for user ID=u belonging to the user set $U_i$ assigned to a leaf having the node i as an ancestor is obtained by substituting "u" into "x" of the above decryption key polynomial $A_i(x)+\lambda_i B(x)$.

In the above case, when the maximum number of conspirators is set to k, the degree of a key generation polynomial is preferably equal to or more than 2k−1 from the viewpoint of safety, and hence is set to 2k−1. However, the degree of the key generation polynomial is not limited to this and may be set to an arbitrary value. In addition, the degree of the key generation polynomial $A_i(x)$ assigned to the node i may differ from the degree of the key generation polynomial $A_j(x)$ assigned to the node j, and the degrees of the key generation polynomials $A_i(x)$ and B(x) may differ from each other. This applies to other embodiments to be described later.

Letting $d_u$ be a decryption key for a user with user ID=u, $d_u$ is given by $$d_u=\{(u,v,A_v(u),B(u))|v \in N, u \in U_v\} \quad (3)$$

Referring to FIG. 15, if the user u is assigned to leaf 0, $d_u$ is given by $$d_u=\{(u,0,A_0(u),B(u)),(u,8,A_8(u),B(u)),(u,12,A_{12}(u),B(u))\} \quad (4)$$

As shown in FIG. 12, processing in the above key generation phase may be performed by a reliable third party apparatus other than the content distribution system 1. In expression (4), although the individual key generation polynomial assigned to the root node (node v="14") is not assigned to the subgroup of leaf 0, the individual key generation polynomial assigned to the root may be assigned to the subgroup of leaf 0. In this case, a decryption key (u, 14, $A_{14}(u)$, B(u)) using the key generation polynomial for the root is added to expression (4) indicating the decryption key for the user with user ID=u. In addition, there may be one or more nodes to which no individual key generation polynomial is assigned. In this case, it is unnecessary to generate the corresponding $c_i$ and $\lambda_i$ in the calculation of the public key e. These apply to each embodiment described below.

Encryption Phase

The session key generation unit 13 of the content distribution system 1 randomly selects the session key s from Gq. The header generation unit 15 then repeats the following processing for j by setting integer j=0 and substituting one of the node IDs of the child nodes of the root of the tree structure T into $v_0$.

If $v_j$ is a leaf ID, the processing is terminated upon substituting the ID of a brother leaf of $v_j$ into $v_{j+1}$. Otherwise, one of the child nodes of the brother node of $v_j$ is selected, and the node ID is substituted into $v_{j+1}$. Then, j is incremented by one.

After the above processing, $\log_2 L+1$ node IDs including two leaf IDs are selected. Note that in the following description, $\log_2 L$ is sometimes written as $\beta$. Referring to FIG. 15, four node IDs (e.g., 0, 1, 9, and 13) are selected.

Figure 6:
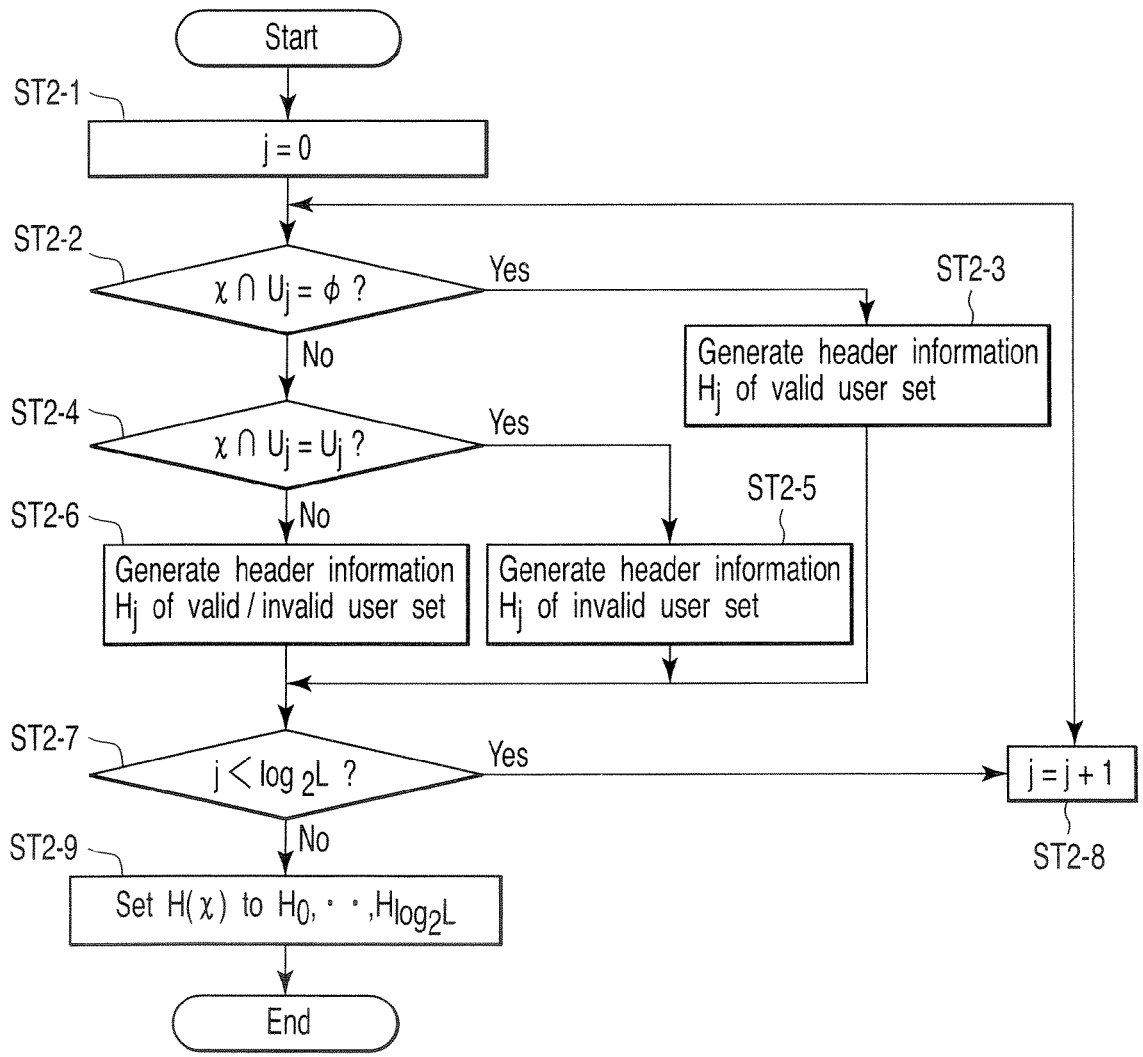
FIG. 6 is a flowchart for explaining operation in an encryption phase.

The header generation unit 15 then selects random numbers $r_0$ and $r_1$ and calculates $Hv_0, \ldots, Hv_\beta$ by repeating the following processing for $0 \leq j \leq \log_2 L$ ($=\beta$) (steps ST2-1 to ST2-8 in FIG. 6)

The header generation unit 15 determines whether the product set of the invalid user set $\chi$ and $Uv_j$ is an empty set (ST2-2).

A case wherein the product set of $\chi$ and $Uv_j$ is an empty set will be described below. This is a case wherein not all users belonging to $Uv_j$ are invalid users. For example, $U_3$ in FIG. 2 corresponds to this case. The header generation unit 15 calculates $Hv_j$ according to expression (5) (ST2-3).

$$H_{v_j} = (h_{v_j}, h'_{v_j}, h_{v_j,0}, \ldots, h_{v_j,y_{v_j}}, \ldots, h_{v_j,2k-1}) \quad (5)$$
$$= (g^r, g^{\lambda_{v_j} r}, g^{ra_0}, \ldots, sg^{rc_{v_j}}, \ldots, g^{ra_{2k-1}})$$
$$y_{v_j} = v_j \bmod 2k$$

For example, only determination in steps ST2-2, ST2-4, and ST2-6 may be performed in advance. If NO is obtained in step ST2-4 (NO in step ST2-4), either $r_0$ or $r_1$ may be substituted into r. Otherwise, $r_0$ is substituted into r.

If it is determined in step ST-2 that the product set of the invalid user set $\chi$ and $Uv_j$ is not an empty set, the header generation unit 15 determines whether the product set of $\chi$ and $Uv_j$ is $Uv_j$ (ST2-4).

A case wherein the product set of $\chi$ and $Uv_j$ is $Uv_j$ will be described below. This is a case wherein all the users belonging to $Uv_j$ are invalid users. For example, $U_1$ in FIG. 2 corresponds to this case. The header generation unit 15 substitutes either $r_0$ or $r_1$ into r and selects a random number $z_{v_j}$. In step ST2-5, if a user set other than $Uv_j$ includes no invalid user, i.e., it is determined that case wherein NO is obtained in step ST2-4 (NO in step ST2-4) does not exist in a user set other than $Uv_j$, $Hv_j$ is calculated according to expression (6) (ST2-5).

$$H_{v_j} = (g^r, g^{\lambda_{v_j} r}, g^{ra_0}, \ldots, g^{z_{v_j}}, \ldots, g^{ra_{2k-1}}) \quad (6)$$

If the user set other than $Uv_j$ includes an invalid user, i.e., a case wherein NO is obtained in step ST2-4 (NO in step ST2-4) exists in the user set other than $Uv_j$, $Hv_j$ is calculated according to expression (7) (ST2-5).

$$H_{v_j} = (h_{v_j}, h'_{v_j}, h_{v_j,0}, \ldots, h_{v_j,y_{v_j}}, \ldots, h_{v_j,2k-1}) \quad (7)$$
$$= \begin{cases} (g^{r_0}, g^{\lambda_{v_j} r_0}, g^{r_0 a_0}, \ldots, g^{z_{v_j}}, \ldots, g^{r_0 a_{2k-1}}) & (r = r_0) \\ \begin{pmatrix} g^{r_1}, g^{\lambda_{v_j} r_1}, g^{L_0} g^{r_1 a_0}, \ldots, \\ g^{z_{v_j}}, \ldots, g^{L_{2k-1}} g^{r_1 a_{2k-1}} \end{pmatrix} & (r = r_1) \end{cases}$$

If neither is the case (the result in step ST2-4 is unknown at this point of time), $r_0$ is substituted into r, and $Hv_j$ is calculated according to expression (6) (ST2-5).

Note that the case represented by expressions (6) and (7) is a case wherein when the decryption keys of all the user systems 2 belonging to a specific subgroup $Uv_j$ are to be invalidated, a value $c_{v_j}$ unique to the specific subgroup $Uv_j$ in the header information $Hv_j$ is set to a value $z_{v_j}$ different from a correct value. However, the present invention is not limited to this. For example, with regard to a subgroup to be invalidated, information $h_{v_j,y_{v_j}}$ which is an element unique to the specific subgroup $Uv_j$ in the header information $Hv_j$ and based on which a session key is calculated may be deleted (inhibited to be written).

With this operation as well, since information based on which a session key is calculated is not included in header information for a subgroup to be invalidated, a correct session key cannot be obtained, whereas a correct session key can be obtained for other subgroups.

A case wherein NO is obtained in step ST2-4 (NO in step ST2-4) will be described. This is a case wherein at least one of the users belonging to $Uv_j$ is not an invalid user, and at least one of the users is an invalid user. For example, this case corresponds to $U_2$ in FIG. 2.

Figure 7:
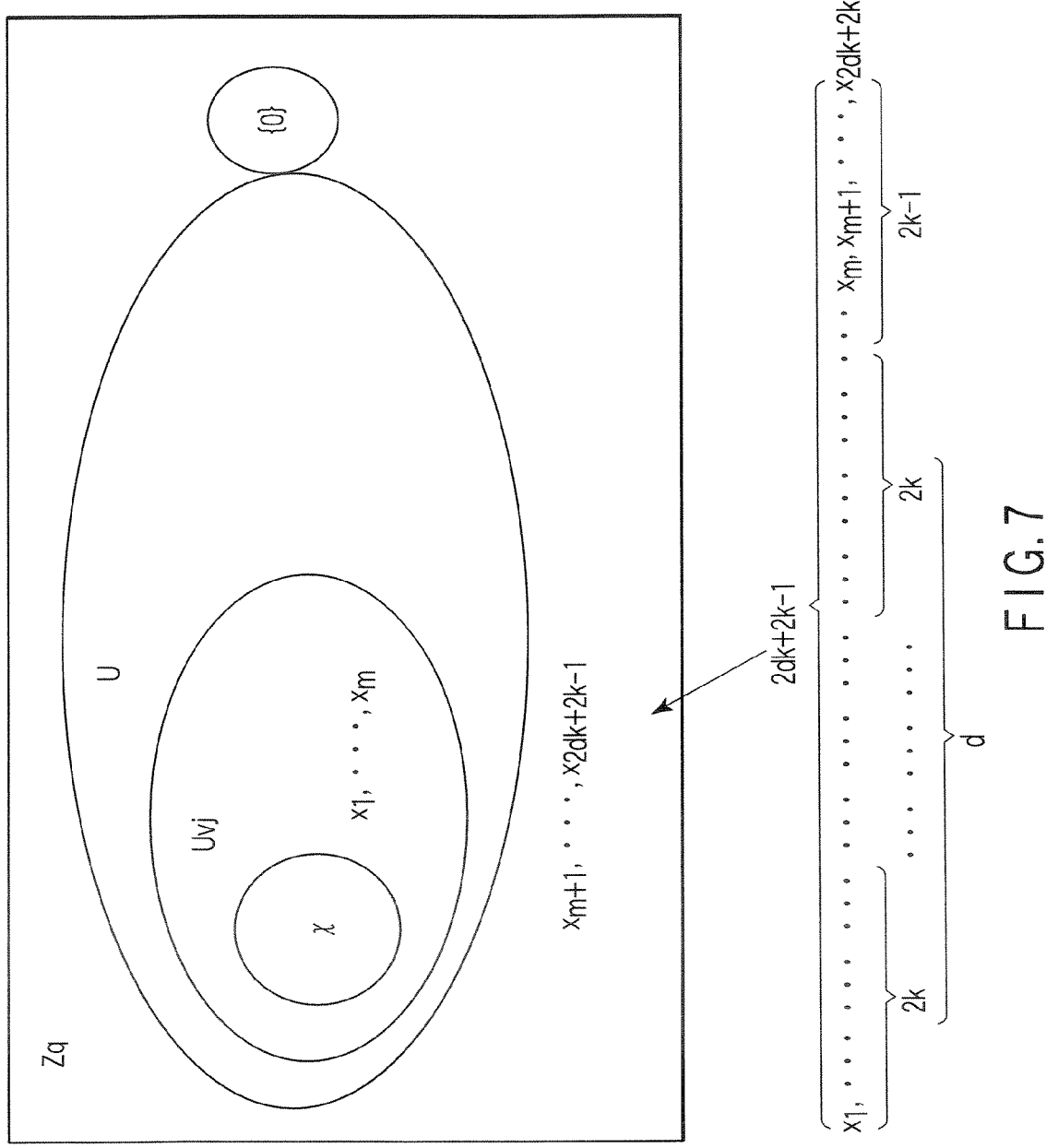
FIG. 7 is a schematic view for explaining processing by a header generation unit.

As shown in FIG. 7 (d=0), the header generation unit 15 obtains a partial set $\{x_1, \ldots, x_m\}$ by removing the invalid user set $\chi$ from $Uv_j$. For example, in the case of $U_2$ in FIG. 2, $\{x_1, \ldots, x_{10}\} = \{31, \ldots, 40\}$ (m=10).

If $2k-m-1>0$, the header generation unit 15 randomly selects $x_{m+1}, \ldots, x_{2k-1}$ from $Zq - (U + \{0\})$. Note that $Zq - (U + \{0\})$ means the value obtained by removing the sum of sets U and $\{0\}$ from Zq.

The header generation unit 15 obtains elements $L_0, \ldots, L_{2k-1}$ of Zq satisfying expression (8) with respect to $1 \leq t \leq 2k-1$.

$$\sum_{i=0}^{2k-1} L_i X_t^i = 0 \bmod q \quad (8)$$

The header generation unit 15 then calculates $Hv_j$ by substituting $r_1$ into r according to expression (9) (ST2-6).

$$H_{v_j} = (h_{v_j}, h'_{v_j}, h_{v_j,0}, \ldots, h_{v_j,y_{v_j}}, \ldots, h_{v_j,2k-1}) \quad (9)$$
$$= (g^r, g^{\lambda_{v_j} r}, g^{L_0} g^{ra_0}, \ldots, sg^{L_{y_{v_j}}} g^{rc_{v_j}}, \ldots, g^{L_{2k-1}} g^{ra_{2k-1}})$$

When decryption keys for one or more user systems 2 of all the user systems belonging to a specific subgroups are to be invalidated, the header generation unit 15 may exclude the user ID of the user system 2 to be invalidated from a partial set $\{x_1 \sim x_m\}$ as a set of users who are not invalid users of the user set belonging to $Uv_j$.

Note that the value $\{L_0, \ldots, L_{2k-1}\}$ based on the partial set is the first vector satisfying the relation represented by the following expression in which the inner product of the first vector and the second vector is "0" when the second vector is obtained by using an ID $\{x_1, \ldots, x_m\}$ of each user belonging to the partial set as a variable of a $(2k-1)$th-degree polynomial.

$$(L_0, L_1, L_2, \ldots, L_{2k-1}) \cdot (1, x_w, x_w^2, \ldots, x_w^{2k-1}) = 0 \bmod q$$

for $x_w = x_1$ to $x_m$

Although the above case is based on the assumption of $m<2k$, the value of m can be permitted within the range of $m<$(degree of key generation polynomial+1) by increasing the degree of the key generation polynomial.

In the above case, even if a case wherein NO is obtained in step ST2-4 (NO in step ST2-4) has occurred two or more times, $r=r_1$ is set. However, the present invention is not limited to this. Three or more random numbers to be substituted into r may be prepared, and a different random number may be substituted into r every time a case wherein NO is obtained in step ST2-4 occurs. This applies to other embodiments to be described later.

$Hv_0, \ldots, Hv_\beta$ obtained by the above repetitive processing are set as a header $H(\chi)$ (ST2-9). In this case, since a header can be calculated by using the public key e, anyone can manage the content distribution system 1.

In addition, the transmission overhead can be further reduced by grouping identical elements of the elements constituting $Hv_0, \ldots, Hv_\beta$ obtained by the above repetitive processing into one and sharing it in the header $H(\chi)$. This applies to each embodiment described below.

In the above case, $\log_2 L+1$ nodes are selected. However, the present invention is not limited to this, and nodes may be selected by the method described below.

Figure 14:
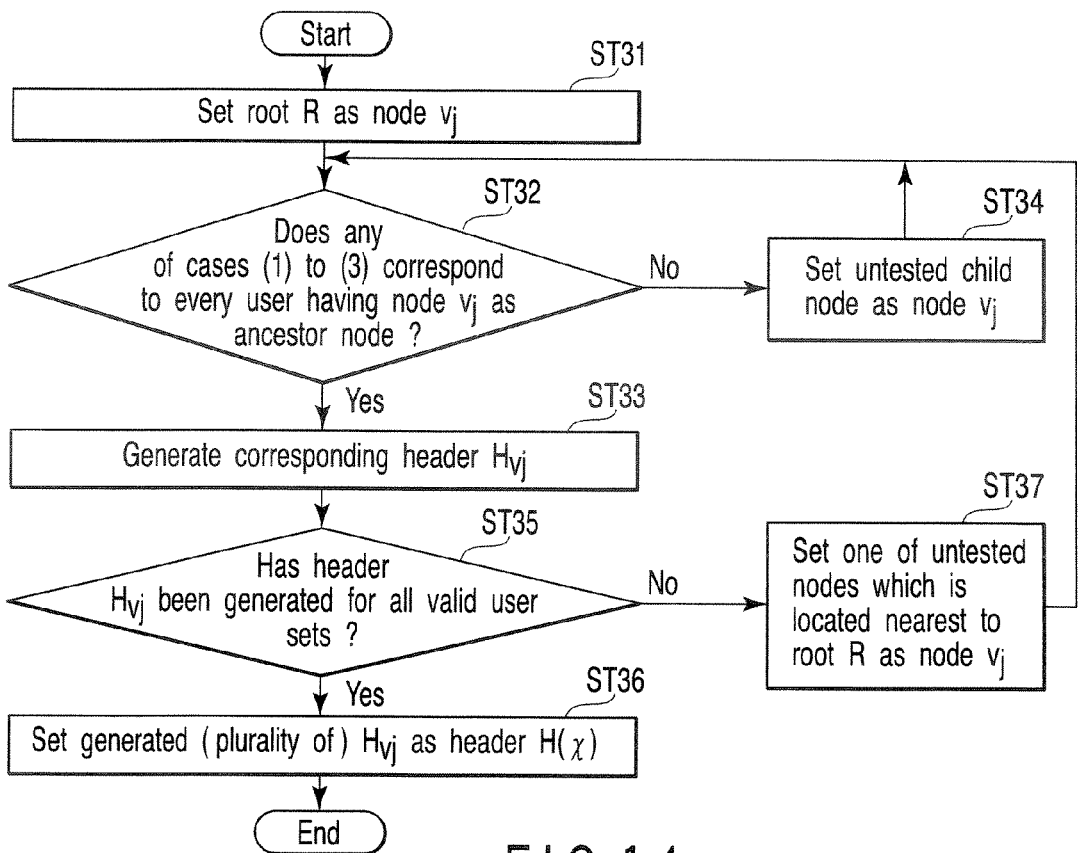
FIG. 14 is a flowchart for explaining another operation in the encryption phase.

The method will be described with reference to FIG. 14. First of all, the header generation unit 15 sets a root R as a node $v_j$ (ST31). It is determined whether each of all users having the node $v_j$ as an ancestor corresponds to any one of following cases (1) to (3) (ST32): (1) a case wherein all the users are invalid users, (2) a case wherein all the users are valid users, and (3) a case wherein the number of valid users is equal to or more than 1 and equal to or less than $2k-1$.

The header generation unit 15 calculates the header $Hv_j$ on the basis of the determination result (ST33). In each case, the header $Hv_j$ is calculated in the same manner as described above.

If a given user does not correspond to any one of cases (1) to (3) (NO in step ST32), a child node which is a child node of the node $v_j$ and has not been tested is set as the node $v_j$ (ST34), and the above processing is repeated. Note that a leaf may be set as the node $v_j$.

It is determined whether $Hv_j$ is generated for all valid user sets (ST35). If $Hv_j$ is generated for all the valid user sets, the generated (a plurality of) $Hv_j$ are set as headers $H(\chi)$ (ST36). Otherwise (NO in step ST35), one of untested nodes which is located nearest to the root R, i.e., the top-level node, is set as the node $v_j$ (ST37), and the above processing is repeated. Note that a leaf may be set as the node $v_j$.

The above description has exemplified the method of selecting a higher-level node as much as possible to further reduce the header size. However, the present invention is not limited to this node selection method. For example, the following selection method can also be used.

Figure 13:
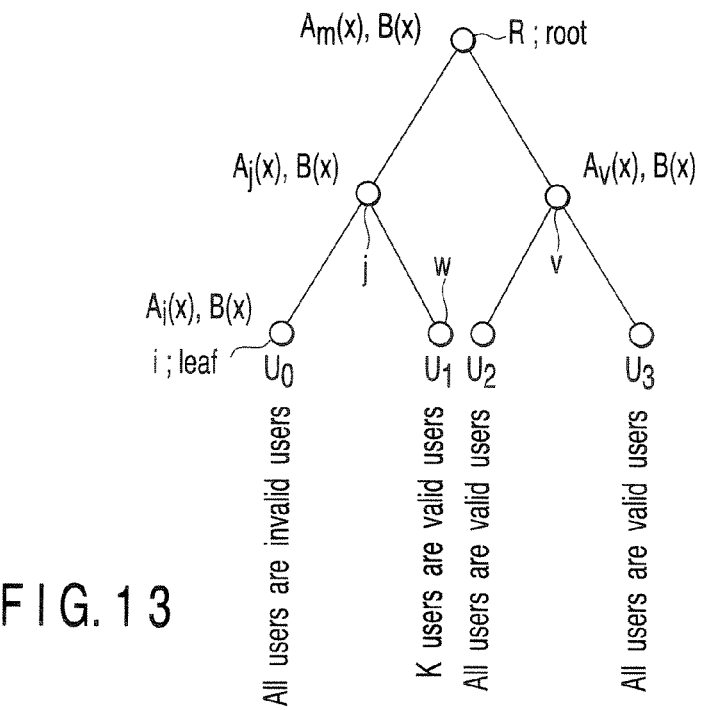
FIG. 13 is a view for explaining how individual key generation polynomials and a common key generation polynomial are assigned to the root/nodes/leaves on a tree structure.

Referring to FIG. 13, assume that all the users belonging to $U_0$ are invalid users, k users of the users belonging to $U_1$ are valid users, all the users belonging to $U_2$ are valid users, and all the users belonging to $U_3$ are valid users. In this case, a node j and a node v are selected and $H(x)=(H_j, H_v)$ according to the flowchart of FIG. 4. In this case, the node j is the parent node of a leaf i (corresponding to $U_0$) and leaf w (corresponding to $U_1$). The node v is the parent node of a leaf corresponding to $U_2$ and a leaf corresponding to $U_3$. However, the present invention is not limited to this. It does not matter how nodes are selected as long as the condition in step S32 is satisfied. For example, the leaf i, leaf w, and node v may be selected. In this case, $H(x)=(H_i, H_w, H_v)$. As another example, the leaf j, leaf w, and node v may be selected. In this case, the header, $H(x)=(H_j, H_w, H_v)$, is constructed in such a way that the valid users belonging to $U_1$ can decrypt at least one of $H_j$ and $H_w$. That various node selection methods can be used in the same manner as in other embodiments described later.

Decryption Phase

Figure 8:
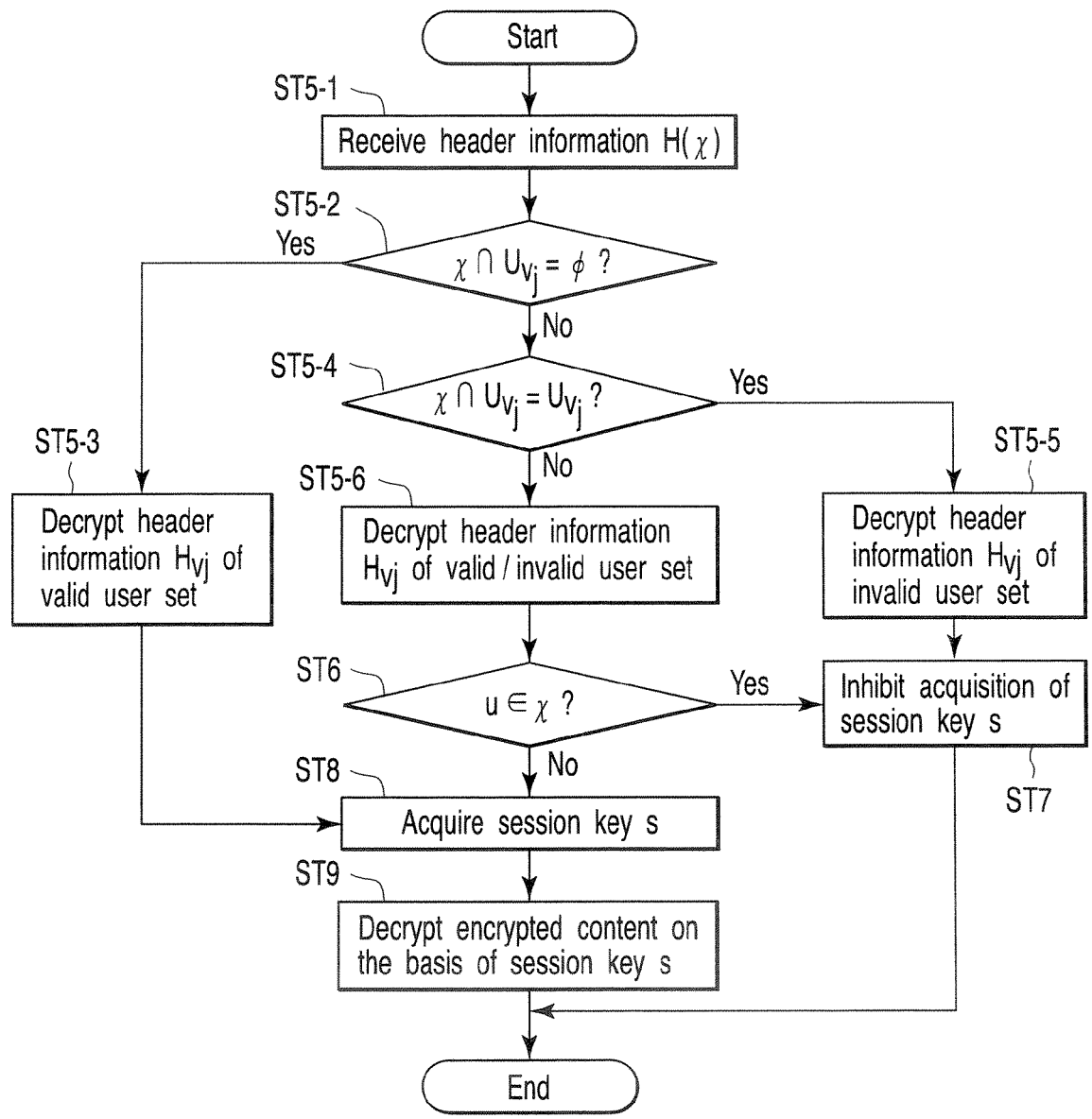
FIG. 8 is a flowchart for explaining operation in a decryption phase.

Consider a user u belonging to the partial set $Uv_j$. As shown in FIG. 8, upon receiving the header $H(\chi)$ (ST5-1), the user system 2 with user ID=u calculates expression (10) by using $Hv_j$.

$$s = \left( \frac{h_{v_j,0} \times \ldots \times h_{v_j,2k-1}^{u^{2k-1}}}{h_{v_j}^{A_{v_j}(u)} h_v^{B(u)}} \right)^{1/u^{y_{v_j}}} \quad (10)$$

$$= \left( \frac{s^{u^{v_j \bmod 2k}} g^{r \sum_{i=0}^{2k-1} a_{v_j,i} u^i}}{g^{r(A_{v_j}(u)+\lambda_{v_j} B(u))}} \right)^{1/u^{y_{v_j}}}$$

$$= \left( s^{u^{v_j \bmod 2k}} \right)^{1/u^{y_{v_j}}}$$

The result obtained by decrypting a session key from header information will be briefly described.

The decryption result obtained by the session key decryption unit 22 of the user system 2 is branched depending on whether the product set of the invalid user set $\chi$ and $Uv_j$ is an empty set (ST5-2), the product set of the invalid user set $\chi$ and $Uv_j$ is $Uv_j$ (ST5-4), or otherwise (ST6). Note that the session key decryption unit 22 of the user system 2 calculates $Hv_j$ according to expression (10) in a decryption sequence common to all the cases without performing this determination.

A case wherein the product set of $\chi$ and $Uv_j$ is an empty set (YES in step ST5-2) will be described. This case is a case wherein all the users belonging to $Uv_j$ are not invalid users, and corresponds to, for example, $U_3$ in FIG. 2. The session key decryption unit 22 performs calculation according to expression (10) (ST5-3), and obtains the session key s (ST8).

A case wherein the product set of $\chi$ and $Uv_j$ is $Uv_j$ (YES in step ST5-4) will be described. This case is a case wherein all the users belonging to $Uv_j$ are invalid users, and corresponds to, for example, $U_1$ in FIG. 2. In this case, since the information $h_{v_j,y_{v_j}}$ which is an element unique to the specific subgroup $Uv_j$ in the header information $Hv_j$ and based on which a session key is calculated is a wrong value (ST5-5), a correct session key cannot be acquired (ST7).

A case other than the above cases will be described below (NO in step ST5-4). This case is a case wherein at least one of the users belonging to $Uv_j$ is not an invalid user, and at least one of the users is an invalid user, and corresponds to $U_2$ in FIG. 2.

The session key s is represented by $$s = \left( \frac{h_{v_j,0} \times \ldots \times h_{v_j,2k-1}^{u^{2k-1}}}{h_{v_j}^{A_{v_j}(u)} h_v^{B(u)}} \right)^{1/u^{y_{v_j}}} \quad (11)$$

$$= \left( \frac{s^{u^{v_j \bmod 2k}} g^{\sum_{i=0}^{2k-1} (L_i + r_1 a_{v_j,i}) u^i}}{g^{r(A_{v_j}(u)+\lambda_{v_j} B(u))}} \right)^{1/u^{y_{v_j}}}$$

$$= \left( s^{u^{v_j \bmod 2k}} \right)^{1/u^{y_{v_j}}}$$

If the user u is an invalid user (YES in step ST6), since expression (12) does not hold, the session key s cannot be obtained (ST7).

$$\sum_{i=0}^{2k-1} L_i u^i = 0 \bmod q \quad (12)$$

Tracking Phase

The following is an example of the sequence of a tracking algorithm. The tracking apparatus 30 and an unauthorized user as a tracking target will be briefly described first. When a pirate decryption unit (unauthorized decryption unit) is confiscated, the tracking apparatus 30 is used to specify an unauthorized user (whose user ID), who has illegally produced the pirate decryption unit, by black box tracking.

A pirate decryption unit is either produced based on only one authorized decryption unit or produced based on a plurality of authorized decryption units. The unauthorized users of the decryption units in the latter case will be referred to as conspirators.

A pirate decryption unit produced based on only one decryption unit can use the same decryption key as that of the decryption unit. A pirate decryption unit produced based on a plurality of decryption units can use each of the same decryption keys as those of the plurality of decryption units. In the latter case, a session key can be obtained unless all the decryption keys for the conspirators are invalidated.

Even in a case wherein a plurality of unauthorized users are in conspiracy with each other, the tracking apparatus 30 can execute a test more quickly than in the prior art in which nCk tests are executed, and specifies one or more unauthorized users.

Sequence Example

Figure 9:
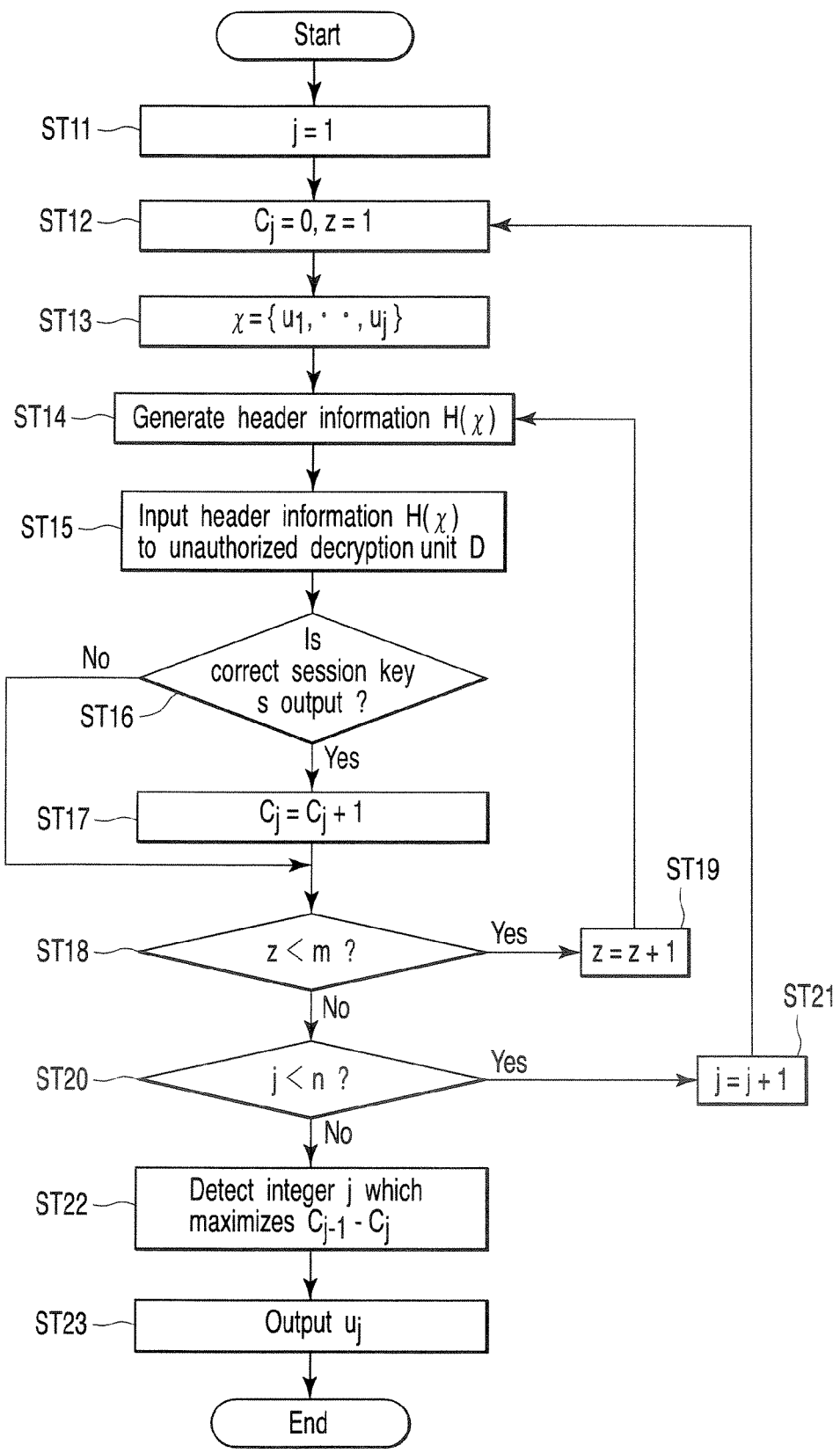
FIG. 9 is a flowchart for explaining operation in a tracking phase.

A concrete tracking algorithm sequence includes various variations, and is not limited to the following. FIG. 9 is a flowchart for explaining the operation of the tracking apparatus in a tracking phase.

When a pirate decryption unit D is confiscated, an unauthorized user is specified by the following processing.

Assume that in the tree structure T, 2k users belongs to each leaf, the respective leaf IDs are assigned 1, . . . , t from the leftmost leaf, and elements of partial sets $U_1, \ldots, U_t$ are labeled according to expression (13).

$$U_1 = \{u_1, \ldots, u_{2k}\}, U_2 = \{u_{2k+1}, \ldots, u_{4k}\} \vdots U_t = \{u_{n-2k+1}, \ldots, u_n\} \quad (13)$$

Note that the number of users belonging to each partial set is not necessarily equal to 2k. For example, the number of users belonging to $U_1$ may be different from the number of users belonging to $U_2$. This applies to each embodiment described below.

The tracking apparatus 30 executes the following processing for j=1, . . . , n (n: the total number of users, j: the user number) (ST11 to ST21). The control unit 33 repeats the following processing m times with normal decryption count $C_j=0$ and test count z=1 for the same invalid user set $\chi$ (ST12).

The control unit 33 sets invalid user set $\chi = \{u_1, \ldots, u_j\}$ (ST13), controls the header generation unit 32, and generates the header $H(\chi)$ (ST14). Note that a header generation method to be used is the same as that in the encryption phase, a random number is randomly selected for every operation. In node selection, $\log_2 L + 1$ nodes $v_j$ which satisfy both conditions (1) and (2) given below are selected. (1) The number of elements of a set obtained by removing $\chi$ from $Uv_j$ is equal to or more than "1" and is less than "2k", the product set of $Uv_j$ and $\chi$ is an empty set, or the product set of $Uv_j$ and $\chi$ is $Uv_j$. (2) The number of nodes where the number of elements of a set obtained by removing $\chi$ from $Uv_j$ is equal to or more than "1" and is less than "2k" is one at most.

When the header generation unit 32 inputs the header $H(\chi)$ to the unauthorized decryption unit D (ST15), the control unit 33 observes an output from the unauthorized decryption unit D.

At this time, the control unit 33 determines whether the unauthorized decryption unit D outputs the correct session key s (ST16). If the decryption unit outputs the correct session key s (YES in step ST16), $C_j$ is incremented by "1" (ST17). Otherwise (NO in step ST16), the value of $C_j$ is not changed.

Note that when the unauthorized decryption unit D outputs only decrypted contents, it is observed whether a content is correctly decrypted. If the content is correctly decrypted, $C_j$ is incremented by "1". Otherwise, the value of $C_j$ is not changed.

In any case, after $C_j$ is updated, the control unit 33 determines whether a test count z is less than m (ST18). If the test count z is less than m, z is incremented by "1" (ST19), and the flow returns to step S14 to repeat a test.

If it is determined in step S18 that the test count z is equal to m, the control unit 33 determines whether a user number j of an invalid user is less than a total user count n (ST20). If the user number j is less than n, j is incremented by "1" (ST21), and the flow returns to step ST12 to repeat a test.

If it is determined in step ST20 that the user number j of the invalid user coincides with the total user count n, the test is terminated.

The control unit 33 then calculates $C_{j-1} - C_j$ with respect to j=1, . . . , n, and detect an integer j by which maximizes $C_{j-1} - C_j$ (ST22), thereby specifying uj as an unauthorized user and outputting its user ID (ST23).

Figure 10:
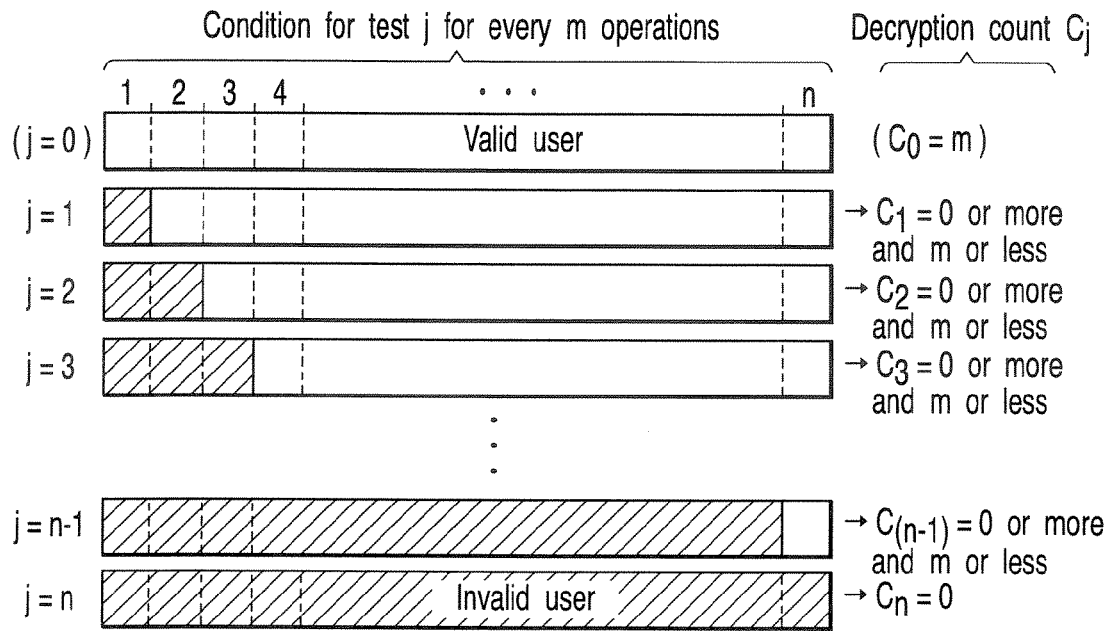
FIG. 10 is a schematic view for explaining an outline of a test.
Figure 11:
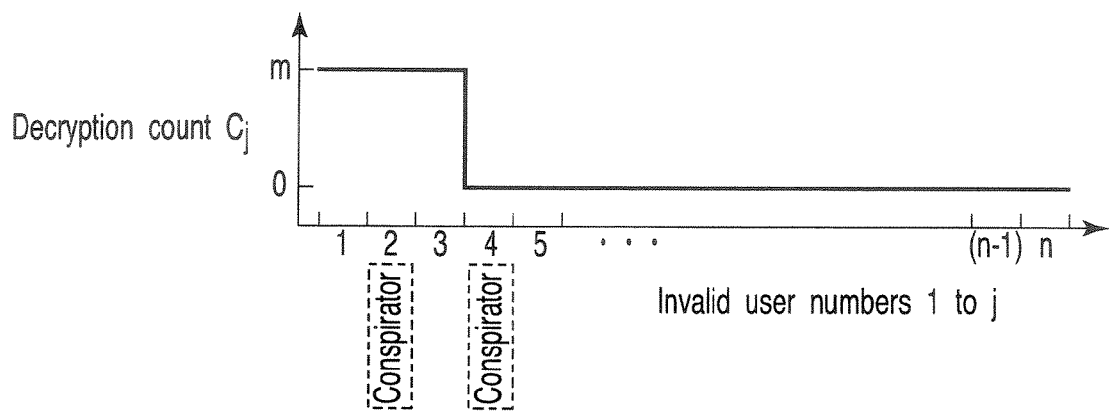
FIG. 11 is a schematic view for explaining a test result.

According to this tracking method, as shown in FIGS. 10 and 11, the number of candidates for unauthorized users belonging to an invalid user set is increased one by one, and it is checked whether decryption is disabled when the candidates for unauthorized users are invalidated. Performing this test a total of mn times makes it possible to specify one or more unauthorized users.

Assume that a set of user IDs is represented by $\{u_1, \ldots, u_n\}$ and user IDs of conspirators of test object decryption units $20\chi$ are $u_2$ and $u_4$.

In this case, when header information generated with user IDs=$u_1$, $u_2$, and $u_3$ representing invalid users is supplied, since the test object decryption unit $20\chi$ corresponds to user ID=$u_4$, a correct session key can be obtained. Therefore, after the processing is repeated m times, $C_3=m$.

When header information generated with user IDs=$u_1$, $u_2$, $u_3$, and $u_4$ representing invalid users is supplied, a correct session key cannot be obtained from the test object decryption unit. Therefore, after the processing is repeated m times, $C_4=0$.

Since $C_3 - C_4$ provides the maximum value m, it is known that the user ID of one of the conspirators of the test object decryption units $20\chi$ is $u_4$. In addition, the user IDs of all the conspirators can be specified by changing the order of labeling of users.

In general, when there is at least one integer j which satisfies $C_{j-1} - C_j \geq m/n$ and a user with user ID=$u_i$ is not an unauthorized user, $C_{i-1} - C_i \ll m/n$. Therefore, an unauthorized user ID can be specified by detecting the integer j which maximizes $C_{j-1} - C_j$.

Assume that a test object decryption unit is a smarter unauthorized decryption unit. In this case, upon detecting black box tracking, the test object decryption unit may reject receiving any inputs from the header generation unit 32 after a given time point. In this case, an unauthorized user ID can be specified as $u_j$ by using the value of j at this time point. This applies to each of the following embodiments.

Since a header can be calculated by using the public key e, anyone can track an unauthorized user by using the tracking apparatus 30.

As described above, according to this embodiment, since header information does not include the user identification information of any user system, information indicating whose decryption key is invalidated does not leak at the time of black box tracking. This prevents the unauthorized decryption unit from knowing the intention of each input at the time of black box tracking, and hence makes it possible to reliably execute tracking even with respect to a smart unauthorized decryption unit which operates to read the intention of an input and deter the specification of an unauthorized user.

According to the conventional black box tracking method, both the key generation polynomials $A_i(x)$ and $B_i(x)$ are different key generation polynomials for nodes. In contrast to this, according to this embodiment, since one key generation polynomial $B(x)$ is made common to all the nodes, the size of decryption key data to be held in the decryption unit can be reduced to almost half while the transmission overhead is kept almost unchanged.

Second Embodiment

The second embodiment of the present invention will be described next. This embodiment will exemplify a method of eliminating the limitation of m<2k without increasing the degree of a key generation polynomial in the encryption phase in the first embodiment if it is determined in step ST2-4 in FIG. 6 that the product set of $\chi$ and $Uv_j$ is not $Uv_j$ (NO in step ST2-4). This embodiment differs from the first embodiment only in the encryption method to be used when it is determined in step ST2-4 that the product set of $\chi$ and $Uv_j$ is not $Uv_j$, and a corresponding decryption method. Therefore, only they will be described below.

Assume that q is a prime number, p−1 is divisible by q, and q is equal to or more than n+2k.

generation unit 15 randomly selects $x_{m+1}, \ldots, x_{2dk+2k-1}$ from $Zq-(U+\{0\})$. Note that $Zq-(U+\{0\})$ means the value obtained by removing the sum of sets U and {0} from Zq.

The header generation unit 15 obtains elements $L_0, \ldots, L_{2dk+2k-1}$ of Zq satisfying expression (14) with respect to $1 \leq t \leq 2dk+2k-1$.

$$\sum_{i=0}^{2dk+2k-1} L_i x_t^i = 0 \bmod q \tag{14}$$

The header generation unit 15 then calculates $Hv_j$ by substituting $r_1$ into r according to expression (15) (ST2-6).

$$H_{v_j} = (h_{v_j}, h'_{v_j}, h_{v_j,0}, \ldots, h_{v_j,2dk+2k-1}) \tag{15}$$

$$h_{v_j} = g^r$$

$$h'_{v_j} = g^{\lambda_{v_j} r}$$

$$h_{v_j,i} = \begin{cases} g^{L_i} g^{ra_i \bmod 2k} & (y_{v_j} \neq i \bmod 2k) \\ sg^{L_i} g^{rc_{v_j}} & (y_{v_j} \neq i \bmod 2k) \end{cases}$$

$$y_{v_j} = v_j \bmod 2k$$

Note that, as described above, three or more random numbers to be substituted into r may be prepared, and a different random number may be substituted into r every time a case wherein NO is obtained in step ST2-4 occurs.

Decryption Phase

Consider a user u belonging to the partial set $Uv_j$. In step ST5-6 in FIG. 8, expression (16) is calculated by using $Hv_j$.

$$s = \left( \frac{h_{v_j,0} \times \ldots \times h_{v_j,2dk+2k-1}^{u^{2dk+2k-1}}}{\left( h_{v_j}^{A_{v_j}(u)} h_{v_j}^{'B(u)} \right)^{\sum_{t=0}^{d} u^{2kt}}} \right)^{1/u^{y_{v_j}} \left( \sum_{t=0}^{d} 2kt+1 \right)} \tag{16}$$

$$= \left( \frac{s^{u^{y_{v_j}} \left( \sum_{t=0}^{d} 2kt+1 \right)} g^{\sum_{i=0}^{2dk+2k-1} L_i u^i} \left( g^{\sum_{i=0}^{2k-1} r_1 a_{v_j,i} u^i} \right)^{\sum_{t=0}^{d} u^{2kt}}}{g^{r1 \left( A_{v_j}(u) + \lambda_{v_j} B(u) \right) \sum_{t=0}^{d} u^{2kt}}} \right)^{1/u^{y_{v_j}} \left( \sum_{t=0}^{d} 2kt+1 \right)}$$

$$= \left( s^{u^{v_j \bmod 2k}} \right)^{1/u^{y_{v_j}}}.$$

Decryption Phase

A case wherein it is determined in step ST2-4 that the product set of $\chi$ and $Uv_j$ is not $Uv_j$ (NO in step ST2-4) will be described next.

As shown in FIG. 7, the header generation unit 15 obtains a partial set as $\{x_1, \ldots, x_m\}$ by removing the invalid user set $\chi$ from $Uv_j$. In this case, m represents the total number of users who are not invalid (valid users) of the user set belonging to $Uv_j$ as in the case described above.

A header generation unit 15 searches for an integer d which satisfies $2dk \leq m \leq 2dk+2k-1$. If $2dk+2k-m-1>0$, the header If the user u is an invalid user (YES in step ST6), expression (17) does not hold. Therefore, a session key s cannot be obtained (ST7).

$$\sum_{i=0}^{2dk+2k-1} L_i u^i = 0 \bmod q \tag{17}$$

As described above, according to the second embodiment, with the arrangement which eliminates the limitation of m<2k, i.e., in a case wherein an invalid user and a valid user who is not an invalid user coexist in a given subgroup $Uv_j$, the number of valid users can be increased by 2dk as compared with the first embodiment (the degree of $x_t$ of expression (14) increases from "2k−1" of expression (8) to "2dk+2k−1", and the number of elements of header information $Hv_j$ increases from "2k−1" of expression (9) to "2dk+2k−1", as indicated by expression (15)).

In addition to the effects of the first embodiment, the second embodiment can cope with a case wherein NO is obtained in step ST2-4 (NO in step S2-4), and the number of valid users exceeds the limitation described in the first embodiment. In addition, with the arrangement configured to eliminate the limitation of m<2k, the same effects as those of the first embodiment can be obtained.

Third Embodiment

The third embodiment of the present invention will be described next. This embodiment exemplifies a case wherein the first embodiment is combined with the decryption key invalidation method disclosed in JP-A 2003-289296 (KO-KAI).

For example, as shown in FIG. 17A (referring to FIGS. 17A to 17C, the underlines indicate invalid users), when only users with user IDs=1, 2, and 3 are to be invalidated, a session key can be decrypted only when four given data (shares to be described later) are completely prepared (for the sake of simplicity, assuming that the number of invalid users is equal to the maximum number of conspirators, a session key can be decrypted only when shares equal in number to the number of invalid users+1 are completely prepared).

A share $(1, g^{F(1)})$ obtained with respect to user ID=1, a share $(2, g^{F(2)})$ obtained with respect to user ID=2, and a share $(3, g^{F(3)})$ obtained with respect to user ID=3 are written in header information. In addition, information based on which a share $(x_i, g^{F(x_i)})$ is obtained with respect to user ID=$x_i$ is written in the header information.

With regard to a user ID other than user IDs=1, 2, and 3, since four necessary shares can be prepared by obtaining the share $(x_i, g^{F(x_i)})$ corresponding to user ID=$x_i$, a correct session key can be acquired.

In contrast to this, with regard to invalid user ID=1, even if the share $(1, g^{F(1)})$ corresponding to user ID=1 is obtained, since it becomes redundant with the share written in the header information, four necessary data cannot be prepared. Therefore, a correct session key cannot be acquired. This applies to user IDs=2 and 3.

When all invalid user IDs=1 to 20 belong to a single subgroup $U_1$ as shown in FIG. 17B, the overall subgroup $U_1$ is invalidated as in the first embodiment instead of using shares corresponding to the total number of invalid users. That is, when, for example, the overall subgroup $U_1$ is to be invalidated, a wrong value (e.g., a random number) is written in information based on which a session key (corresponding to the subgroup $U_1$) is calculated such that a correction session key cannot be obtained.

With regard to a user ID belonging to the subgroup $U_1$, since a wrong value is set as information based on which a session key is calculated, a correct session key cannot be obtained.

In addition, when user IDs=21, 22, and 23 are to be invalidated while user IDs=1 to 20, i.e., the overall subgroup $U_1$, are invalidated, as shown in FIG. 17C, the method shown in FIG. 5 is executed in combination with the method shown in FIG. 17A and FIG. 17B.

In this case, a share $(21, g^{F(21)})$ obtained with respect to user ID=21, a share $(22, g^{F(22)})$ obtained with respect to user ID=22, and a share $(23, g^{F(23)})$ obtained with respect to user ID=23 are written in header information. With regard to only the subgroup $U_1$ to be invalidated, a wrong value (e.g., a random value) is written in information based on which a share (corresponding to the subgroup $U_1$) is calculated such that a correction share cannot be obtained. With regard to other subgroups, a correct value is written in information based on which a share (corresponding to the subgroup) is calculated such that a correct share can be obtained.

With regard to a user ID other than the user IDs belonging to the subgroup $U_1$ and user IDs=21, 22, and 23, a correct share can be obtained. With this operation, four necessary data can be prepared, and hence a correct session key can be acquired.

With regard to user IDs=21, 22, and 23, even if a correct share can be obtained, since four necessary shares cannot be prepared, a correct session key cannot be acquired.

With regard to a user ID belonging to the subgroup $U_1$, since information based on which a correct share is calculated is a wrong value, four correct shares cannot be prepared. As a consequence, a correct session key cannot be acquired.

A key generation phase, encryption phase, decryption phase, and tracking phase will be described below in the order named. Note that the definitions of parameters and the like are the same as those in the first embodiment, unless otherwise specified.

Key Generation Phase

This embodiment is the same as the first embodiment except that q is a prime number, p−1 is divisible by q, and q is equal to or more than n+4k−1.

Decryption Phase

Let E be an invalid user set in the encryption phase. That is, E represents a set of users to be invalidated when header information for distribution in the content distribution system is to be generated.

A session key generation unit 13 of a content distribution system 1 selects information s based on which a session key is calculated randomly from Zq, and calculates a session key $g^s$. The header generation unit 15 then selects a node in a tree structure T by the following processing.

If the node $v_j$, which is an ancestor node of leaves assigned the user set $Uv_j$ that is equal to E or included in E, exist, node is selected from such nodes such that selected sets $Uv_j$ have no common element, and the sum of the sets is equal to expression (18).

$$\bigcup_{v_j \in \{v | v \in N, U_v \subseteq E\}} U_{v_j} \qquad (18)$$

If brother leaves, neither $Uv_i$ which is a user set assigned to the one of the brother leaves nor $Uv_j$ which is a user set assigned to the other of the brother leaves is equal to E or included in E, exist, a pair of such brother leaves is selected. Lastly, other nodes which satisfy the following condition are selected. This condition is that the sets $Uv_j$ of all the selected nodes $v_j$ have no common element, and the sum of the sets $Uv_j$ of all the selected nodes $v_j$ is equal to a total user set U.

Let J be the number of nodes selected after the above processing.

The header generation unit 15 obtains a partial set (represented by expression (19)) as $\{x_1, \ldots, x_w\}$ by removing the sum of all sets $Uv_j$ equal to or included in the invalid user set E from the invalid user set E.

$$E \setminus \bigcup_{v_j \in \{v | v \in N, U_v \subseteq E\}} U_{v_j} \qquad (19)$$

For example, referring to FIG. 17B, since the sum of all sets $Uv_j$ equal to or included in E is $U_1$, the partial set obtained by removing $U_1$ from the invalid user set E is $\{21, 22, 23\}$.

As described above, w represents the number of users to be individually inhibited from decrypting a session key.

The header generation unit 15 then searches for an integer z which satisfies $2k(z-1)+1 \leq w \leq 2kz$, and sets the number (m) of shares in header information to $m=2k(z+1)-1$. Note that k represents the maximum number of conspirators, as described above.

If the above partial set is an empty set, i.e., there is no user to be individually inhibited from decrypting a session key, $m=2k-1$ and $w=0$ are set.

If the number (w) of users to be individually inhibited from decrypting a session key is smaller than the above number m (w<m), $x_{w+1}, \ldots, x_m$ are randomly selected from $Zq-(U+\{0\})$ to obtain (m−w) shares corresponding to the shortage. Note that $Zq-(U+\{0\})$ means the value obtained by removing the sum of sets U and $\{0\}$ from Zq.

The header generation unit 15 randomly generates a polynomial F(x) satisfying expression (20).

$$F(x) = \sum_{i=0}^{m} \tau_i x^i \bmod q \tag{20}$$

$$\tau_0 = s$$

The header generation unit 15 then selects random numbers $r_0$ and $r_1$. The header generation 15 calculates $Hv_0, \ldots, Hv_{J-1}$ with respect to $0 \leq j \leq J-1$ according to expression (21) with J nodes being represented by $v_0, \ldots, V_{J-1}$.

$$H_{v_j} = (h_{v_j}, h'_{v_j}, h_{v_j,0}, \ldots, h_{v_j,m}, \hat{h}_1, \ldots \hat{h}_m)$$

where $$h_{v_j} = g^r$$

$$h'_{v_j} = g^{\lambda_{v_j} r}$$

$$h_{v_j,i} = \begin{cases} g^{r a_{i \bmod 2k}} g^{\tau_i} & (y_{v_j} \neq i \bmod 2k) & (21a) \\ g^{c_{v_j} r} g^{\tau_i} & (y_{v_j} \neq i \bmod 2k, U_{v_j} \notin E) & (21b) \\ g^{\gamma v_{j,i}} & (y_{v_j} \neq i \bmod 2k, U_{v_j} \subseteq E) & (21c) \end{cases}$$

$$\hat{h}_i = (x_i, g^{F(x_i)})$$

$$F(x) = \sum_{i=0}^{m} \tau_i x^2 \bmod q$$

$$y_{v_j} = v_j \bmod 2k$$

where $Yv_{j,i}$ is a random number selected by the header generation unit 15.

Note that in expression (21), of the calculation expression for information $hv_{j,i}$ based on which a session key is calculated, expression (21a) corresponds to a case wherein a user to be individually inhibited from decrypting a session key exists in the user set belonging to the node $v_j$, and expression (21b) corresponds to a case wherein all the users belonging to the node $v_j$ are not invalid users, with the node $v_j$ including a unique value $cv_j$. In addition, expression (21c) corresponds to a case wherein all the users belonging to the node $v_j$ are invalid users, with the node $v_j$ including a random number $\gamma_{v_j}$ different from the unique correct value $Cv_j$ instead of it.

$Hv_0, \ldots, Hv_{J-1}$ obtained by the above repetitive processing are used as header information. In this case, since the header can be calculated by using a public key e, anyone can manage the content distribution system 1. In addition, as in the first embodiment, the transmission overhead can be further reduced by grouping identical elements of the elements constituting $Hv_0, \ldots, Hv_{J-1}$ obtained by the above repetitive processing into one and sharing it in the header. Furthermore, various types of methods other than the above node selection method can be used.

Decryption Phase

Consider a user $x_0$ belonging to a partial set $Uv_j$. Upon receiving a header, a user system 2 with user $ID=x_0$ calculates expression (22) by using $Hv_j$.

$$g^{F(x_0)} = \prod_{i=0}^{m} h_{v_j,i}^{x_0^i} / \left( h_{v_j}^{Av_j(x_0)} h_{v_j}^{'B(x_0)} \right)^{\sum_{j=0}^{z} x_0^{2jk}}$$

In this case, $z=(m+1)/2k-1$.

$$\prod_{i=0}^{m} h_{v_j,i}^{x_0^i} \text{ is calculated as follows:} \tag{22}$$

$$\prod_{i=0}^{m} h_{v_j,i}^{x_0^i} = \prod_{l=0}^{z} \left( h_{v_j,2ik} \times h_{v_j,2ik+1}^{x_0} \times \ldots \times h_{v_j,2ik+y_{v_j}}^{x_0^{y_{v_j}}} \times \ldots \times h_{v_j,2ik+2k-1}^{x_0^{2k-1}} \right)^{x_0^{2ik}}$$

$$= \prod_{l=0}^{z} \left( g^{r \sum_{i=0}^{2k-1} av_{j,i} x_0^i} \right)^{x_0^{2kl}} \times g^{\sum_{j=0}^{m} \tau_j x_0^j}$$

$$= \left( h_{v_j}^{Av_j(x_0)} h_{v_j}^{'B(x_0)} \right)^{\sum_{l=0}^{z} x_0^{2kl}} \times g^{F(x_0)}$$

In this case, calculated $g^{F(x_0)}$ is the share of the user $x_0$. The user system 2 obtains a session key by calculating expression (23) by using $g^{F(x_0)}$ and m shares $\hat{h}_1, \ldots, \hat{h}_m$ included in the header.

$$g^{F(0)} = \prod_{j=0}^{m} \left( g^{F(x_j)} \right)^{\mu_j} \tag{23}$$

$$= g^{\sum_{j=0}^{m} \mu_j F(x_j)}$$

where $$\mu_j = \prod_{0 \leq l \leq m, 1 \neq j} \frac{x_1}{x_1 - x_j} \bmod q$$

Tracking Phase

A tracking algorithm sequence example is the same as that in the first embodiment, and the operation of the tracking apparatus in a tracking phase is the same as that shown in FIG. 9 except for the following difference. In this case, a header can be calculated by using a public key e, and hence anyone can track an unauthorized user by using a tracking apparatus 30.

In step ST13 in FIG. 9, when $u_j$ is included in E (a set of users to be actually invalidated in the above encryption phase in the content distribution system), a control unit 33 substitutes $C_{j-1}$ into $C_j$ and increments j by one. A test with $\chi = \{u_1, \ldots, u_j\}$ may be skipped. In step ST14, a session key is $g^{F(x0)} = g^s$, and a header generation method is executed in the following manner.

In node selection, a header generation unit 32 selects a node $v_j$ which satisfies both conditions (1) and (2). (1) The number of elements of a set obtained by removing $\chi$ from $Uv_j$ is equal to or more than "1" and equal to or less than "2k−1", the product set of $Uv_j$ and $\chi$ is an empty set, or the product set of $Uv_j$ and $\chi$ is $Uv_j$. (2) The number of nodes where the number of elements of a set obtained by removing $\chi$ from $Uv_j$ is equal to or more than "1" and equal to or less than "2k−1" is one at most. The header generation unit 32 calculates $Hv_j$ of each selected node according to expression (24).

$$H_{v_j} = (h_{v_j}, h'_{v_j}, h_{v_j,0}, \ldots, h_{v_j,m}, \hat{h}_1, \ldots, \hat{h}_m) \quad (24)$$

$$h_{v_j} = \begin{cases} g^{r_0} & (r = r_0) \\ g^{r_1} & (r = r_1) \end{cases}$$

$$h'_{v_j} = \begin{cases} g^{\lambda_{v_j} r_0} & (r = r_0) \\ g^{\lambda_{v_j} r_1} & (r = r_1) \end{cases}$$

$$\hat{h}_i = (x_i, g^{F(x_i)})$$

$$F(x) = \sum_{i=0}^{m} \tau_i x^i \bmod q$$

$$y_{v_j} = v_j \bmod 2k$$

Remaining elements $hv_j$ i are calculated in the following manner.

If the product set of $Uv_j$ and $\chi$ is an empty set, $h_{v_j,i}$ is calculated according to expression (25).

$$h_{v_j,i} = \begin{cases} g^{r a_i \bmod 2k} g^{\tau_i} & (y_{v_j} \neq i \bmod 2k) \\ g^{c_{v_j} r} g^{\tau_i} & (y_{v_j} = i \bmod 2k, U_{v_j} \not\subseteq E) \\ g^{\gamma_{v_j,i}} & (y_{v_j} = i \bmod 2k, U_{v_j} \subseteq E) \end{cases}$$

where $\gamma_{v_j,i}$ is a random number.

Note that if (1) the number of elements of a set obtained by removing $\chi$ from $Uv_j$ is equal to or more than "1" and equal to or less than "2k−1" or (2) the product set of $Uv_j$ and $\chi$ is $Uv_j$ and the product set of $Uv_j$ and the partial set obtained by removing the sum of all sets $Uv_j$ equal to or included in E from the invalid user set E is an empty set, $r_0$ is substituted into r. Otherwise, $r_0$ or $r_1$ is randomly substituted into r.

If the number of elements of a set obtained by removing $\chi$ from $Uv_j$ is equal to or more than "1" and equal to or less than "2k−1", the sum of the set obtained by removing $\chi$ from $Uv_j$ and the partial set obtained by removing the sum of all sets $Uv_j$ equal to or included in E from the invalid user set E is represented by $\{x_1, \ldots, x_w\}$. If w<m, $x_{w+1}, \ldots, x_m$ are randomly selected from $Zq-(U+\{0\})$. Note that $Zq-(U+\{0\})$ means the value obtained by removing the sum of sets U and $\{0\}$ from Zq. With respect to $1 \leq t \leq m$, elements $L_0, \ldots, L_m$ which satisfy expression (26) are obtained.

$$\sum_{i=0}^{m} L_i x_i^t = 0 \bmod q \quad (26)$$

Subsequently, $h_{v_j,i}$ is calculated by substituting $r_1$ into r according to expression (27).

$$h_{v_j,i} = \begin{cases} g^{r_1 a_i \bmod 2k} g^{\tau_i} g^{L_i} & (y_{v_j} \neq i \bmod 2k) \\ g^{c_{v_j} r_1} g^{\tau_i} g^{L_i} & (y_{v_j} = i \bmod 2k) \end{cases} \quad (27)$$

If the product set of $Uv_j$ and $\chi$ is $Uv_j$, the product set of $Uv_j$ and the partial set obtained by removing the sum of all sets $Uv_j$ equal to or included in E from the invalid user set E is calculated first.

If the product set of $Uv_j$ and the partial set obtained by removing the sum of all sets $Uv_j$ equal to or included in E from the invalid user set E is not an empty set, $r_1$ is substituted into r, and it is determined whether selected nodes include a node $v_i$ where the number of elements of the set obtained by removing $\chi$ from $Uv_i$ is equal to or more than "1" and equal to or less than "2k−1".

If the selected nodes include the node $v_i$ where the number of elements of the set obtained by removing $\chi$ from $Uv_i$ is equal to or more than "1" and equal to or less than "2k−1", $h_{v_j,i}$ is calculated according to equation (28).

$$h_{v_j,i} = \begin{cases} g^{r_1 a_i \bmod 2k} g^{\tau_i} g^{L_i} & (y_{v_j} \neq i \bmod 2k) \\ g^{c_{v_j} r_1} g^{\tau_i} g^{L_i} & (y_{v_j} = i \bmod 2k) \end{cases} \quad (28)$$

If the selected nodes do not include the node $v_i$ where the number of elements of the set obtained by removing $\chi$ from $Uv_i$ is equal to or more than "1" and equal to or less than "2k−1", the partial set obtained by removing the sum of all sets $Uv_j$ equal to or included in E from the invalid user set E is represented by $\{x_1, \ldots, x_w\}$. If w<m, $x_{w+1}, \ldots, x_m$ are randomly selected from $Zq-(U+\{0\})$. Note that $Zq-(U+\{0\})$ means the value obtained by removing the sum of sets U and $\{0\}$ from Zq. With respect to $1 \leq t \leq m$, elements $L_0, \ldots, L_m$ which satisfy expression (26) are obtained.

Subsequently, $h_{v_j,i}$ is calculated according to expression (29).

$$h_{v_j,i} = \begin{cases} g^{r_1 a_i \bmod 2k} g^{\tau_i} g^{L_i} & (y_{v_j} \neq i \bmod 2k) \\ g^{c_{v_j} r_1} g^{\tau_i} g^{L_i} & (y_{v_j} = i \bmod 2k) \end{cases} \quad (29)$$

Note that if $L_0, \ldots, L_m$ have already been generated, already generated $L_0, \ldots, L_m$ are used and are not generated again.

If the product set of $Uv_j$ and the partial set obtained by removing the sum of all sets $Uv_j$ equal to or included in E from the invalid user set E is an empty set, $r_0$ or $r_1$ is randomly substituted into r, and it is determined whether the selected nodes include a node $v_i$ where (1) the number of elements of a set obtained by removing $\chi$ from $Uv_j$ is equal to or more than "1" and equal to or less than "2k−1" or (2) the product set of $Uv_j$ and $\chi$ is $Uv_j$ and the product set of $Uv_j$ and the partial set obtained by removing the sum of all sets $Uv_j$ equal to or included in E from the invalid user set E is an empty set.

If the selected nodes include the node $v_i$ where (1) the number of elements of a set obtained by removing $\chi$ from $Uv_j$ is equal to or more than "1" and equal to or less than "$2k-1$" or (2) the product set of $Uv_j$ and $\chi$ is $Uv_j$ and the product set of $Uv_j$ and the partial set obtained by removing the sum of all sets $Uv_j$ equal to or included in E from the invalid user set E is an empty set, $h_{v_j,i}$ is calculated according to expression (30).

$$h_{v_j,i} = \begin{cases} g^{r_0 a_{i mod 2k}} g^{\tau_i} & (y_{v_j} \neq i mod 2k, r = r_0) \\ g^{r_1 a_{i mod 2k}} g^{\tau_i} g^{L_i} & (y_{v_j} \neq i mod 2k, r = r_1) \\ g^{\gamma_{v_j,i}} & (y_{v_j} = i mod 2k) \end{cases}$$

where $\gamma v_{j,i}$ is a random number.

If the selected nodes do not include the node $v_i$ where (1) the number of elements of a set obtained by removing $\chi$ from $Uv_j$ is equal to or more than "1" and equal to or less than "$2k-1$" or (2) the product set of $Uv_j$ and $\chi$ is $Uv_j$ and the product set of $Uv_j$ and the partial set obtained by removing the sum of all sets $Uv_j$ equal to or included in E from the invalid user set E is an empty set, $h_{v_j,i}$ is calculated according to expression (31).

$$h_{v_j,i} = \begin{cases} g^{r a_{i mod 2k}} g^{\tau_i} & (y_{v_j} \neq i mod 2k) \\ g^{\gamma_{v_j,i}} & (y_{v_j} = i mod 2k) \end{cases} \quad (31)$$

where $\gamma_{v_j,i}$ is a random number.

If $v_0, \ldots, v_{J-1}$ represent the selected nodes, $Hv_0, \ldots, Hv_{J-1}$ obtained by the above repetitive processing are used as header information.

As described above, in addition to the effects of the first embodiment, owing to the arrangement obtained by combining the first embodiment and the decryption key invalidation method disclosed in JP-A 2003-289296 (KOKAI), the third embodiment can cope with a case wherein NO is obtained in step ST2-4 (NO in step S2-4), and the number of valid users exceeds the limitation described in the first embodiment. In addition, an increase in transmission overhead when the number of valid users greatly exceeds the limitation described in the first embodiment can be suppressed more than in the second embodiment. Furthermore, the same effects as those of the first embodiment can be obtained by the arrangement obtained by combining the first embodiment and the decryption key invalidation method disclosed in JP-A 2003-289296 (KOKAI).

Although all the embodiments described above are mainly expressed in the category of "system". However, it is obvious that the embodiment is not limited to this, and the embodiments may be expressed in an arbitrary category such as the category of "apparatus", "method", "computer-readable storage medium", or "program". In addition, obviously, it suffices to extract part of a system and express it in another category as well as changing the overall category of the system.

Each of the encryption apparatuses, decryption units, and tracking apparatuses of all the embodiments described above can be implemented as hardware such as a semiconductor integrated device and as software (a program for causing a computer to execute a predetermined means or causing a computer to function as a predetermined means, or causing a computer to implement a predetermined function). Obviously, hardware and software can be implemented in combination with each other.

When each device is implemented as a program, the program can be distributed by being stored in storage media such as magnetic disks (floppy (registered trademark) disks and hard disks), optical disks (CD-ROMs, DVDs, and the like), magneto-optical disks (MOs), and semiconductor memories.

This storage medium can take any storage forms as long as the storage medium can store programs and is a computer-readable storage medium.

In addition, an OS (Operating System) operating on a computer on the basis of commands from programs installed from a storage medium into the computer, MW (middleware) such as database management software or network software, or the like may execute part of the processes for implementing this embodiment.

The storage medium in the embodiments includes not only a medium independent of the computer but also a storage medium in which a program sent through a LAN, Internet, or the like is downloaded and stored or temporarily stored.

In addition, the number of storage media is not limited to one, and the storage medium of the embodiments also includes a plurality of media used to execute the processes in this embodiment. That is, the embodiment is not limited to any specific storage arrangement.

Note that the computer executes the respective processes in this embodiment on the basis of the programs stored in the storage medium, and the embodiment may take any arrangement, e.g., an apparatus consisting of a single device such as a personal computer or a system constituted by a plurality of devices connected to each other through a network.

Furthermore, the computer of the embodiments above is not limited to a personal computer, and is a generic name for devices and apparatuses capable of implementing the functions of the embodiments above on the basis of programs, including arithmetic processing units, microcomputers, and the like contained in information processing devices.

The respective user systems are assigned to leaves on a tree structure on a subgroup basis, and are classified and identified according to the respective leaves and their ancestor nodes on the tree structure. Therefore, since header information does not include the user identification information of a user system, black box tracking can be reliably executed with respect to even a smart unauthorized decryption unit, which operates to read the intention of each input and deter the specification of an unauthorized user, without allowing the unauthorized decryption unit to know the intention of each input. Introducing a common key generation polynomial common to a plurality of nodes and a plurality of leaves on a tree structure makes it possible to reduce the size of decryption key data to be held by a decryption unit as compared with the conventional method capable of performing similar black box tracking while keeping similar transmission overhead.

As described above, according to the above embodiments, black box tracking can be reliably executed even with respect to a smart unauthorized decryption unit without allowing the unauthorized decryption unit to know the intention of each input, and the size of decryption key data to be held by the decryption unit can be reduced.

What is claimed is:

1. A content distribution system which distributes an encrypted content and header information to a plurality of user systems, comprising:
   a first encryption unit configured to encrypt a content such that the content is adapted to be decrypted with a session key, to obtain the encrypted content;
   a second encryption unit connected to the first encryption unit and configured to encrypt the session key with a public key corresponding to a plurality of decryption keys respectively assigned to the user systems, to obtain an encrypted session key;

a generation unit connected to the first and second encryption units and configured to generate the header information which includes the encrypted session key and allows the encrypted session key to be decrypted by using one of a plurality of decryption keys unique to each user system which is permitted to decrypt the encrypted session key;

a memory to store the one of the plurality of decryption keys unique to each user system; and a transmission unit connected to the first encryption and generation units and configured to transmit the encrypted content and the header information to each user system;

wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

2. A system according to claim 1, wherein at least one of linear sums of coefficients with the same degree of the individual key generation polynomial and the common key generation polynomial differs for each of the root, the nodes, and the leaves on the tree structure, and the linear sums of other coefficients with the same degrees are constant.

3. A system according to claim 1, wherein
the header information includes one or a plurality of unique data items, each of which is unique to each of the root, the nodes, and the leaves on the tree structure, and
wherein the generation unit, when invalidating decryption keys of all user systems belonging to a specific subgroup of the subgroups, substitutes a specific unique data item of the unique data items which corresponds to a leaf assigned to the specific subgroup or an ancestor node of the leaf with a different data item from the specific unique data item, or does not include, in the header information, the specific unique data item.

4. A system according to claim 1, wherein
the header information includes one or a plurality of unique data items, each of which is unique to each of the root, the nodes, and the leaves on the tree structure and a value based on a partial set of a plurality of user identification information items belonging to a specific subgroup of the subgroups, and
wherein the generation unit does not include, in the partial set, a user identification information item of a user system whose decryption key is invalidated, the user system being one of all user systems belonging to the specific subgroup.

5. A system according to claim 4, wherein
the header information includes one or a plurality of unique data items, each of which is unique to each of the root, the nodes, and the leaves on the tree structure and a value based on a partial set of a plurality of user identification information items belonging to a specific subgroup of the subgroups, and wherein the generation unit, when invalidating decryption keys of all user systems belonging to another subgroup different from the specific subgroup of the subgroups, substitutes one of the unique data items which corresponds to a leaf assigned to the another subgroup or an ancestor node of the leaf with a different data item from the one of the unique data items, or does not include, in the header information, the one of the unique data items.

6. A system according to claim 1, wherein
the generation unit generates first header information which corresponds to one of the nodes on the tree structure and allows the encrypted session key to be decrypted by using a decryption key assigned to a user system of user systems belonging to a subgroup assigned to each leaf having the node as an ancestor node which is permitted to decrypt the encrypted session key, and second header information which corresponds to one of the leaves on the tree structure and allows the encrypted session key to be decrypted by using a decryption key assigned to a user system of user systems belonging to a subgroup assigned to the leaf which is permitted to decrypt the encrypted session key, and
the transmission unit transmits identical elements of elements in the first header information and the second header information so as to allow the identical elements to be shared.

7. A system according to claim 1, wherein
if the number of user systems which are to be individually inhibited from decrypting the encrypted session key is not less than one, the encrypted session key is adapted to be decrypted by using m +1 types of share data items with respect to a value m set on the basis of a relationship between the number (w) of user systems which are to be individually inhibited from decrypting the encrypted session key and degrees of the individual key generation polynomial and the common key generation polynomial, and the generation unit generates header information including (a) one or a plurality of unique data items based on each of which the share data item unique to each user system is obtained and each of which is unique to each of the root, the nodes, and the leaves on the tree structure, and (b) m share data items which include w share data items unique to user systems which are to be individually inhibited from decrypting the encrypted session key and do not depend on a decryption key held by each user system which is permitted to decrypt the encrypted session key.

8. A system according to claim 7, wherein the generation unit, when inhibiting all users belonging to a specific subgroup other than a subgroup to which a user system to be individually inhibited from decrypting the encrypted session key from decrypting the encrypted session key, substitutes a specific unique data item of the unique data items which corresponds to a leaf assigned to the specific subgroup or an ancestor node of the leaf with a different data item from the specific unique data item, or dose not includes, in the header information, the specific unique data item.

9. A user system comprising:
a memory to store one of a plurality of decryption keys unique to the user system which is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying a plurality of user systems, and (c) substituting the user identification information item of the user system into one of the individual key generation polynomials which corresponds to one of the leaves assigned to one of the subgroups to which the user identification information item corresponding to the user system belongs or an ancestor node of the one of the leaves, and substituting the user identification information item of the user system into a common key generation polynomial common to the root, the nodes, and the leaves;

a receiving unit configured to receive an encrypted content obtained by encrypting a content with a session key and header information which includes an encrypted session key and allows the encrypted session key to be decrypted;

a session key decryption unit configured to decrypt the session key from the received header information by using the one of the plurality of decryption keys; and a content decryption unit configured to decrypt the received encrypted content by using the decrypted session key.

10. A system according to claim 9, wherein at least one of linear sums of coefficients with the same degree of the individual key generation polynomial and the common key generation polynomial differs for each of the root, the nodes, and the leaves on the tree structure, and the linear sums of other coefficients with the same degrees are constant.

11. A system according to claim 9, wherein
the header information includes one or a plurality of unique data items, each of which is unique to each of the root, the nodes, and the leaves on the tree structure, and when decryption keys of all user systems belonging to a specific subgroup of the subgroups are to be invalidated, one of the unique data items which is unique to a leaf assigned to the specific subgroup or an ancestor node of the leaf is substituted with a different data item from the one of the unique data items or deleted, and
the session key decryption unit decrypts the session key by using a unique data item which is included in the header information and is unique to a leaf or an ancestor node thereof on the tree structure which is assigned to a subgroup to which the user identification information item corresponding to the user system belongs.

12. A system according to claim 9, wherein
the header information includes one or a plurality of unique data items, each of which is unique to each of the root, the nodes, and the leaves on the tree structure and a value based on a partial set of a plurality of user identification information items belonging to a specific subgroup of the subgroups, and the partial set is set so as not to include user identification information item of a user system of user systems belonging to the specific subgroup which is made to invalidate a decryption key, and
the session key decryption unit decrypts the session key by using a unique data item which is included in the header information and is unique to a leaf or an ancestor node thereof on the tree structure which is assigned to the subgroup to which the user identification information item corresponding to the user system belongs, and data item based on the partial set of a plurality of user identification information items belonging to the subgroup.

13. A system according to claim 12, wherein in order to invalidate decryption keys of user systems belonging to another subgroup different from the specific subgroup of the subgroups, the header information includes a different data item from a unique data item which is unique to a leaf assigned to the another subgroup or an ancestor node of the leaf, or the header information does not include the unique data item which is unique to the leaf assigned to the another subgroup or the ancestor node of the leaf.

14. A system according to claim 9, wherein
in order to allow the session key to be decrypted, if the number of user systems which are to be individually inhibited from decrypting the encrypted session key is not less than one, by using the encrypted session key is adapted to be decrypted by using m +1 types of share data with respect to a value m set on the basis of a relationship between the number (w) of user systems which are to be individually inhibited from decrypting the encrypted session key and degrees of the individual key generation polynomial and the common key generation polynomial, the header information includes (a) an unique data item based on which share data unique to each user system is obtained and which is unique to each of the root, the nodes, and the leaves on the tree structure, and (b) m share data items which include w share data items unique to user systems which are to be individually inhibited from decrypting the encrypted session key and do not depend on a decryption key held by each user system which is permitted to decrypt the encrypted session key, and
the session key decryption unit obtains the share data item unique to the user system by using the unique data item which is included in the header information and is unique to a leaf or an ancestor node thereof on the tree structure which is assigned to a subgroup to which user identification information item corresponding to the user system belongs, and decrypts the session key by using the obtained share data item and m share data items included in the header information.

15. A system according to claim 14, wherein in order to inhibit all users belonging to a specific subgroup other than a subgroup to which a user system to be individually inhibited from decrypting the encrypted session key belongs from decrypting the encrypted session key,
the header information includes a different data item from a unique data item which is unique to a leaf assigned to the specific subgroup or an ancestor node of the leaf, or the header information does not include the unique data item which is unique to the leaf assigned to the specific subgroup or the ancestor node of the leaf.

16. A tracking system which tests a test object user system and specifies an unauthorized user from a plurality of users of a plurality of user systems, comprising:
a content encryption unit configured to encrypt a content with a session key to obtain an encrypted content;
a generation unit configured to generate header information which includes an encrypted session key obtained by encrypting the session key and allows the encrypted session key to be decrypted with one of a plurality of decryption keys of each user system which is permitted to decrypt the encrypted session key;
an acquiring unit connected to test object user system and configured to acquire a decryption result of the encrypted content which is obtained by the test object user system by inputting the encrypted content and the header information to the test object user system;

a specifying unit, connected to the generation unit and the test object user system, configured to specify not less than one user system based on which test object user system is produced from the user systems on the basis of a relationship between each header information and each decryption result acquired when the each header information is input to the test object user system, by causing the generation unit to generate the header information while changing the number of user systems to be invalidated which are inhibited from decrypting the encrypted session key; and a memory to store the one of the plurality of decryption keys unique to the user system;

wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

17. A system according to claim 16, wherein at least one of linear sums of coefficients with the same degree of the individual key generation polynomial and the common key generation polynomial differs for each of the root, the nodes, and the leaves on the tree structure, and the linear sums of other coefficients with the same degrees are constant.

18. A system according to claim 16, wherein when the decryption result is that the encrypted content is decrypted, if the number of user systems to be invalidated is j−1, and the decryption result is that the encrypted content is not decrypted, if a number obtained by adding another user system different from the j−1 user systems to the user systems to be invalidated is j, the specifying unit specifies the another user system as an unauthorized user.

19. A content distribution method in a content distribution system which distributes an encrypted content and header information to a plurality of user systems, comprising:
    encrypting a content using a first encryption unit such that the content is adapted to be decrypted with a session key, to obtain the encrypted content;
    encrypting the session key using a second encryption unit with a public key corresponding to a plurality of decryption keys respectively assigned to the user systems, to obtain an encrypted session key;
    generating, using a generation unit, the header information which includes the encrypted session key and allows the encrypted session key to be decrypted by using one of a plurality of decryption keys unique to each user system which is permitted to decrypt the encrypted session key;
    storing the decryption key unique to each user system in a memory; and
    transmitting the encrypted content and the header information to each user system using a transmission system,
    wherein one of the decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

20. A method for decrypting an encrypted content in a user system, including:
    storing, in a memory, one of a plurality of decryption keys unique to the user system which is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying a plurality of user systems, and (c) substituting the user identification information item of the user system into one of the individual key generation polynomials which corresponds to one of the leaves assigned to one of the subgroups to which the user identification information item corresponding to the user system belongs or an ancestor node of the one of the leaves, and substituting the user identification information item of the each user system into a common key generation polynomial common to the root, the nodes, and the leaves;
    receiving an encrypted content obtained by encrypting a content with a session key and header information which includes an encrypted session key and allows the encrypted session key to be decrypted;
    decrypting the session key from the received header information by using the one of the plurality of decryption keys; and
    decrypting the received encrypted content by using the decrypted session key.

21. A method for specifying an unauthorized user from a plurality of users of a plurality of user systems, the method applied to a tracking system which tests a test object user system and includes:
    a content encryption unit configured to encrypt a content with a session key to obtain an encrypted content;
    a generation unit configured to generate a header information item which includes an encrypted session key obtained by encrypting the session key and allows the encrypted session key to be decrypted with one of a plurality of decryption keys of each user system which is permitted to decrypt the encrypted session key;
    a memory to store the one of the plurality of decryption keys unique to each user system; and
    an acquiring unit configured to acquire a decryption result of the encrypted content which is obtained by the test object user system by inputting the encrypted content and the header information item to the test object user system; the method including:
    causing the generation unit to generate the header information item while changing the number of user systems to be invalidated which are inhibited from decrypting the encrypted session key, to obtain a plurality of header information items;

specifying not less than one user system based on which the test object user system is produced from the user systems on the basis of a relationship between each of the header information items and each decryption result acquired when the each of the header information items is input to the test object user system, wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

22. A computer readable non-transitory medium storing a computer program, the computer program for operating a computer to distribute an encrypted content and header information to a plurality of user systems, the computer program comprising:

first program instruction means for instructing the computer processor to encrypt a content such that the content is adapted to be decrypted with a session key, to obtain the encrypted content;

second program instruction means for instructing the computer processor to encrypt the session key with a public key corresponding to a plurality of decryption keys respectively assigned to the user systems, to obtain an encrypted session key;

third program instruction means for instructing the computer processor to generate the header information which includes the encrypted session key and allows the encrypted session key to be decrypted by using one of a plurality of decryption keys unique to each user system which is permitted to decrypt the encrypted session key; and fourth program instruction means for instructing the computer processor to transmit the encrypted content and the header information to each user system;

wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

23. A computer readable non-transitory medium storing a computer program, the computer program for operating a computer as a user system decrypting an encrypted content distributed from a content distribution system, the computer program comprising:

first program instruction means for instructing the computer processor to store, in a memory, one of a plurality of decryption keys unique to the user system which is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying a plurality of user systems, and (c) substituting the user identification information item of the user system into one of the individual key generation polynomials which corresponds to one of the leaves assigned to one of the subgroups to which the user identification information item corresponding to the user system belongs or an ancestor node of the one of the leaves, and substituting the user identification information item of the each user system into a common key generation polynomial common to the root, the nodes, and the leaves;

second program instruction means for instructing the computer processor to receive an encrypted content obtained by encrypting a content with a session key and header information which includes an encrypted session key and allows the encrypted session key to be decrypted;

third program instruction means for instructing the computer processor to decrypt the session key from the received header information by using the one of the plurality of decryption keys; and fourth program instruction means for instructing the computer processor to decrypt the received encrypted content by using the decrypted session key.

24. A computer readable non-transitory medium storing a computer program, the computer program for operating a computer as a tracking system which tests a test object user system and specifies an unauthorized user from a plurality of users of a plurality of user systems, the computer program comprising:

first program instruction means for instructing the computer processor to encrypt a content with a session key to obtain an encrypted content;

second program instruction means for instructing the computer processor to generate header information which includes an encrypted session key obtained by encrypting the session key and allows the encrypted session key to be decrypted with one of a plurality of decryption keys of each user system which is permitted to decrypt the encrypted session key;

third program instruction means for instructing the computer processor to acquire a decryption result of the encrypted content which is obtained by the test object user system by inputting the encrypted content and the header information to the test object user system; and fourth program instruction means for instructing the computer processor to specify not less than one user system based on which the test object user system is produced from the user systems on the basis of a relationship between each header information and each decryption result acquired when the each header information is input to the test object user system, by causing the generation unit to generate the header information while changing the number of user systems to be invalidated which are inhibited from decrypting the encrypted session key;

wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

25. An encryption apparatus which generates an encrypted content and header information which are distributed to a plurality of user systems, comprising:

a first encryption unit configured to encrypt a content such that the content is adapted to be decrypted with a session key, to obtain the encrypted content;

a second encryption unit connected to the first encryption unit and configured to encrypt the session key with an encryption key corresponding to a plurality of decryption keys respectively assigned to the user systems, to obtain an encrypted session key;

a generation unit connected to the first and second encryption units and configured to generate the header information which includes the encrypted session key and allows the encrypted session key to be decrypted by using one of a plurality of decryption keys unique to each user system which is permitted to decrypt the encrypted session key; and a memory to store the one of the plurality of decryption keys unique to each user system;

wherein the one of the plurality of decryption keys unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying the user systems, and (c) substituting the user identification information item of the each user system into one of the individual key generation polynomials which corresponds to one of leaves assigned to one of the subgroups to which the user identification information item corresponding to the each user system belongs or an ancestor node of the one of the leaves, and substituting the user identification information item of the each user system into a common key generation polynomial common to the root, the nodes, and the leaves.

26. A decryption apparatus included in a user system which receives an encrypted content obtained by encrypting a content with a session key and header information which includes an encrypted session key and allows the encrypted session key to be decrypted, the apparatus comprising:

a memory to store one of a plurality of decryption keys unique to the user system which is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a group of a plurality of user identification information items which are for individually identifying a plurality of user systems, and (c) substituting the user identification information item of the user system into one of the individual key generation polynomials which corresponds to one of the leaves assigned to one of the subgroups to which the user identification information item corresponding to the user system belongs or an ancestor node of the one of the leaves, and substituting the user identification information item of the each user system into a common key generation polynomial common to the root, the nodes, and the leaves;

a session key decryption unit configured to decrypt the session key from the received header information by using the one of the plurality of decryption keys; and a content decryption unit configured to decrypt the received encrypted content by using the decrypted session key.

* * * * *